US010129427B2

(12) United States Patent
Mochizuki

(10) Patent No.: US 10,129,427 B2
(45) Date of Patent: Nov. 13, 2018

(54) SYSTEM FOR ESTABLISHING COMMUNICATION BETWEEN A PLURALITY OF TERMINALS, METHOD OF CONTROLLING THE SAME, AND STORAGE MEDIUM

(71) Applicant: CANON KABUSHIKI KAISHA, Tokyo (JP)

(72) Inventor: Hirofumi Mochizuki, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/251,365

(22) Filed: Aug. 30, 2016

(65) Prior Publication Data
US 2017/0078512 A1 Mar. 16, 2017

(30) Foreign Application Priority Data
Sep. 11, 2015 (JP) .................... 2015-180115

(51) Int. Cl.
G06F 3/12 (2006.01)
H04N 1/00 (2006.01)
(Continued)

(52) U.S. Cl.
CPC ..... *H04N 1/00973* (2013.01); *G06F 11/0733* (2013.01); *H04L 41/5074* (2013.01);
(Continued)

(58) Field of Classification Search
CPC .. H04N 1/00973; H04N 41/5074; H04N 1/00; H04N 1/00244; H04N 1/00344;
(Continued)

(56) References Cited

U.S. PATENT DOCUMENTS

| 2014/0086105 A1* | 3/2014 | Kang ................ H04L 67/26 370/259 |
| 2014/0189808 A1 | 7/2014 | Mahaffey et al. ................ 726/4 |
| 2015/0181057 A1 | 6/2015 | Mutsuno ................ 358/1.14 |
| 2015/0301765 A1* | 10/2015 | Nishiyama ............ G06F 3/1203 358/1.15 |
| 2015/0341348 A1* | 11/2015 | Yang .................. H04L 63/0853 726/7 |

FOREIGN PATENT DOCUMENTS

| EP | 1833222 | 9/2007 |
| EP | 2797282 | 10/2014 |

(Continued)

OTHER PUBLICATIONS

Counterpart European Search Report, European Application No. 16185264.5, dated Jan. 30, 2017.
(Continued)

Primary Examiner — Gabriel Garcia
(74) Attorney, Agent, or Firm — Fitzpatrick, Cella, Harper & Scinto

(57) ABSTRACT

In a communication system including a first terminal and a second terminal, a management server manages the first terminal and the second terminal, and a relay server relays communication between the first terminal and the second terminal, upon authenticating the first terminal, the management server notifies the first terminal of first authentication information for requesting authentication to the relay server and connection information for connecting to the relay server, and upon authenticating the second terminal, the management server notifies the second terminal of second authentication information for requesting authentication to the relay server. In response to a request from the first terminal, the relay server creates access information and transmits it to the first terminal. The relay server transmits the access information to the second terminal and relays the communication performed between the first terminal and the second terminal.

9 Claims, 25 Drawing Sheets

(51) Int. Cl.
  *H04L 12/24*   (2006.01)
  *H04N 1/32*    (2006.01)
  *H04L 29/06*   (2006.01)
  *G06F 11/07*   (2006.01)
  *H04L 29/08*   (2006.01)

(52) U.S. Cl.
  CPC .......... *H04L 63/083* (2013.01); *H04L 63/102* (2013.01); *H04L 67/14* (2013.01); *H04L 67/16* (2013.01); *H04N 1/00* (2013.01); *H04N 1/00244* (2013.01); *H04N 1/00344* (2013.01); *H04N 1/32406* (2013.01); *H04L 63/168* (2013.01); *H04L 67/10* (2013.01); *H04N 2201/0094* (2013.01)

(58) Field of Classification Search
  CPC ........ H04N 1/32406; H04N 2201/0094; G06F 3/1285; H04L 63/083; H04L 63/102; H04L 63/168; H04L 67/10; H04L 67/14; H04L 67/16
  USPC ................................. 358/1.1–1.18
  See application file for complete search history.

(56) References Cited

FOREIGN PATENT DOCUMENTS

| JP | 2013-029922 | 2/2013 |
| JP | 2014-059720 | 4/2014 |

OTHER PUBLICATIONS

Ricciardi Fulvio et al: MIT Kerberos Consortium—Protocol Tutorial, Nov. 27, 2007 (Nov. 27, 2007) XP055338186, Retrieved from the Internet:URL:http://www.kerberos.org/software/tutorial.html [retrieved on Jan. 24, 2017], pp. 1-10.

Peter R Egli et al:"AAA/Radius Introduction to Radius, A Protocol for Authentication, Authorization and Accounting Service", Dec. 4, 2010 (Dec. 4, 2010), XP055338226, Retrieved from the Internet:URL:http://fr.slideshare.net/PeterREgli/aaa-radius?qid=761d5447-c683-4a88-bbee-b501fb256e5a&v=&b=&from_search=1 [retrieved on Jan. 24, 2017], pp. 1-12.

* cited by examiner

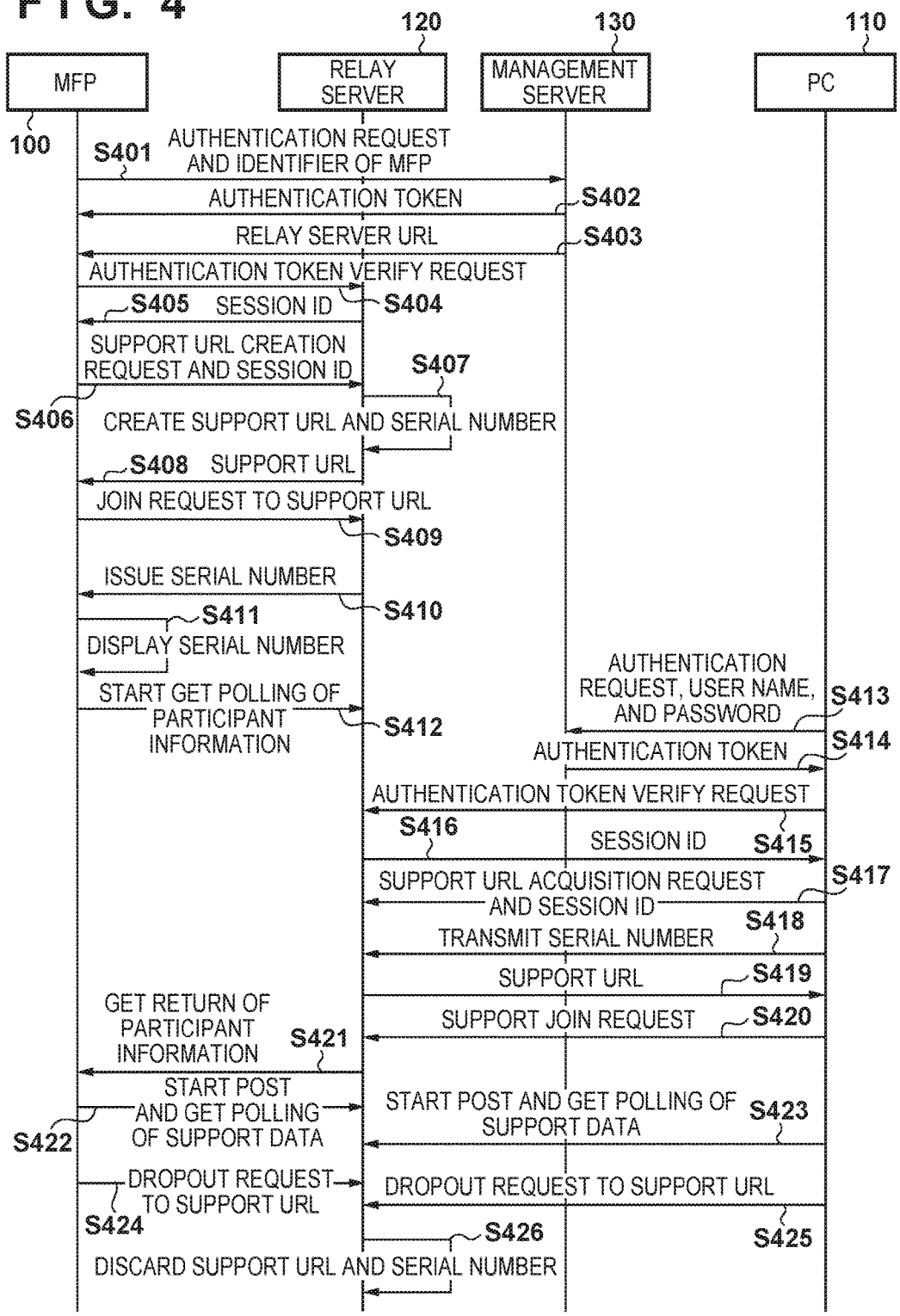

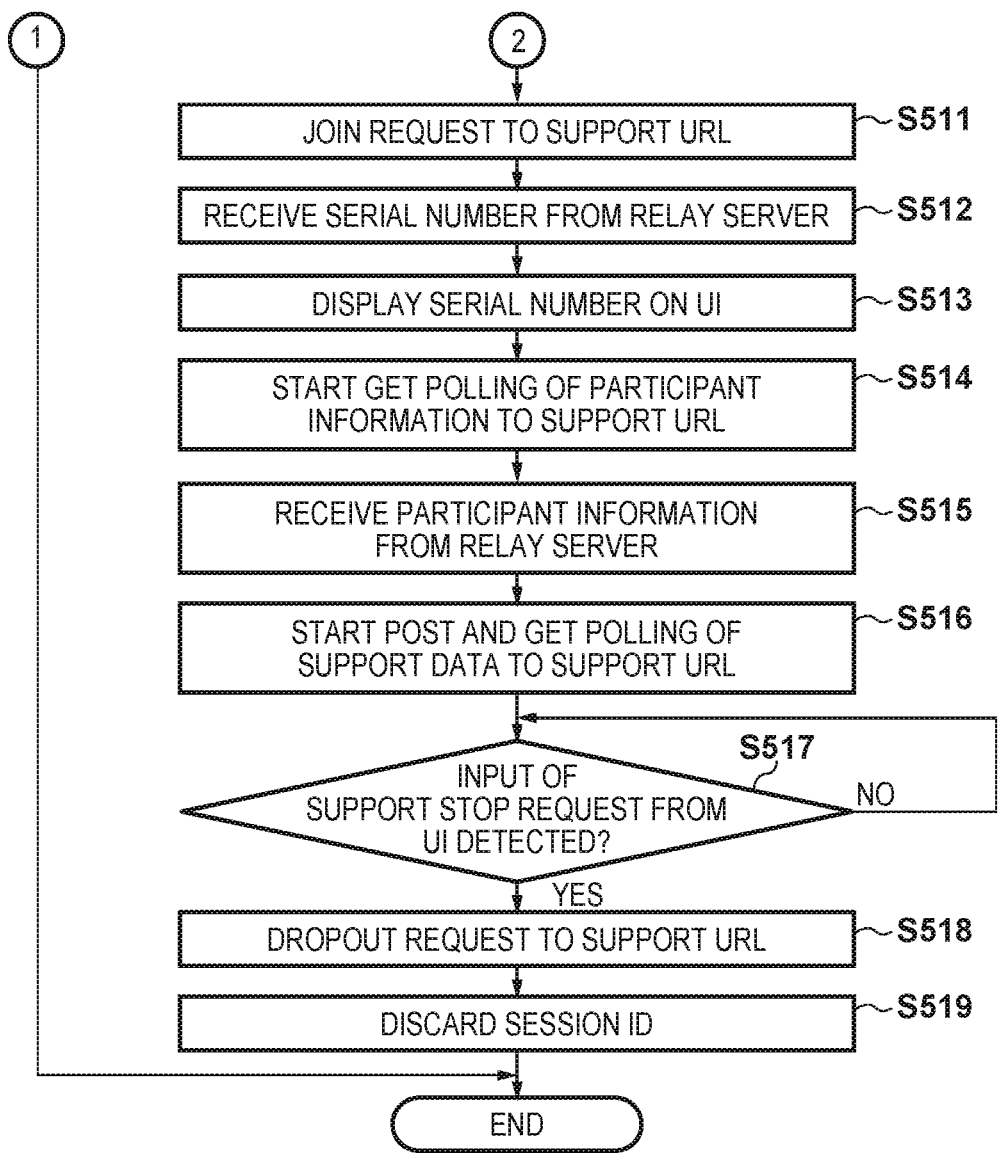

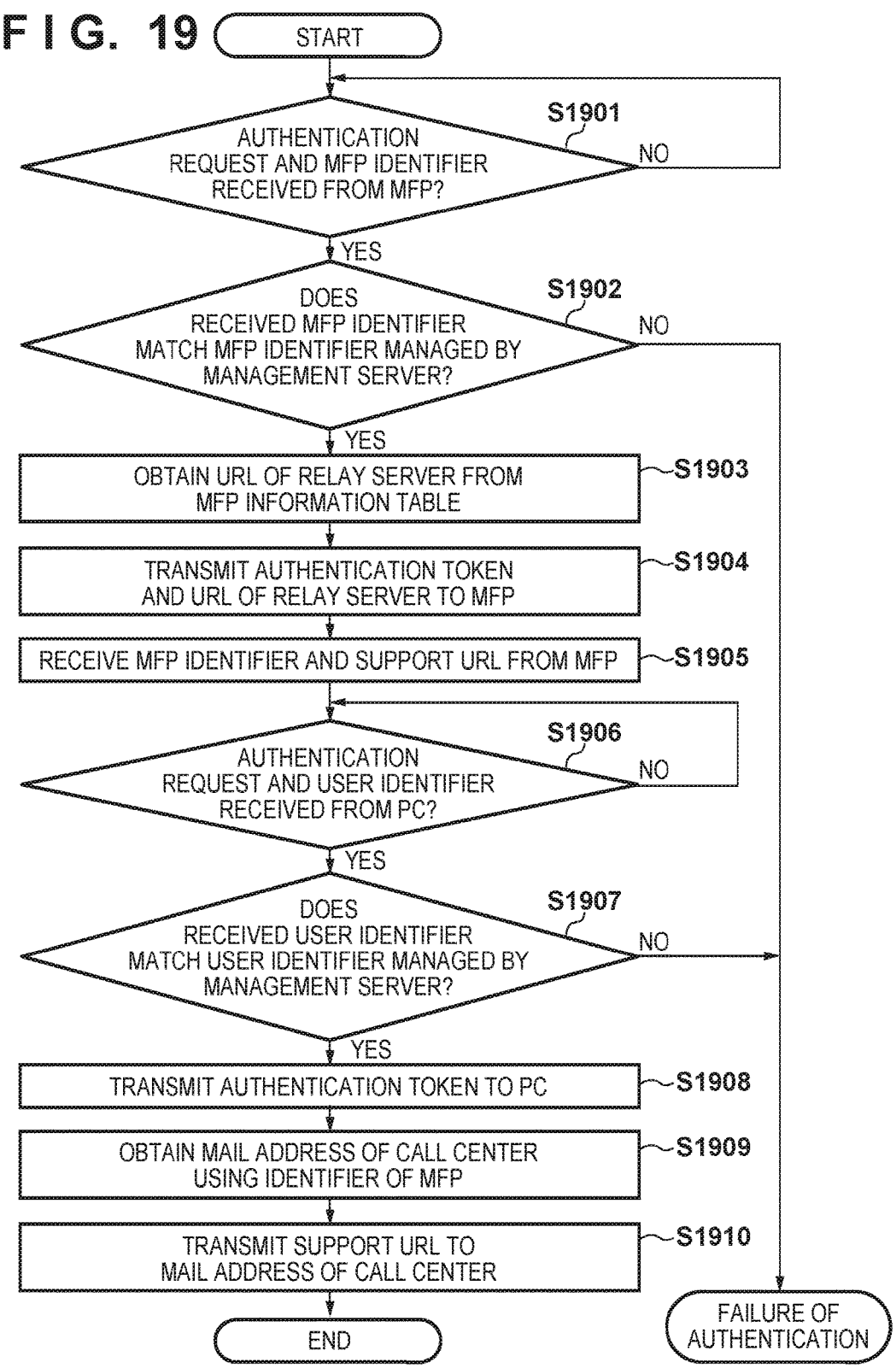

SYSTEM FOR ESTABLISHING COMMUNICATION BETWEEN A PLURALITY OF TERMINALS, METHOD OF CONTROLLING THE SAME, AND STORAGE MEDIUM

BACKGROUND OF THE INVENTION

Field of the Invention

The present invention relates to a communication system and a method of controlling the same, an image forming apparatus and a method of controlling the same, and a storage medium.

Description of the Related Art

As the troubleshooting for products is becoming complicated, customers frequently make direct telephone inquiries to the maker's call centers to cope with troubles. Japanese Patent Laid-Open No. 2014-59720 (D1) discloses a remote maintenance service that uses voice and moving image communication and remote control for quick troubleshooting between an image forming apparatus and a call center. In this remote maintenance service, the image forming apparatus that receives support and an information processing apparatus in the call center that provides the support normally exist in different firewalls.

Japanese Patent Laid-Open No. 2013-29922 (D2) proposes placing, on the Internet, a relay server configured to relay communication between an image forming apparatus and an information processing apparatus so as to allow them to communicate. When such a relay server is placed, the apparatuses that exist in different firewalls can communicate.

Assuming that the technique described in D2 is applied to the remote maintenance service of D1, when a remote maintenance service start request is received from a customer, the image forming apparatus and the call center need to be connected to the relay server. At this time, it is also necessary to confirm whether the image forming apparatus connected to the relay server is an image forming apparatus with a contract of the remote maintenance service and authenticate the apparatus. To implement this, it is necessary to appropriately manage, for all image forming apparatuses as the application targets of the remote maintenance service, information representing a sales organization to which an image forming apparatus belongs and what kind of contract is made for the image forming apparatus.

In general, a call center is run for each sales organization of image forming apparatuses. Hence, the relay server is prepared for each sales organization to reduce the load on the relay server or ensure security. Not one relay server but a plurality of relay servers are placed. The call center grasps the information of the relay servers to which the sales organization of its own is connected, and can therefore be connected to an appropriate relay server.

On the other hand, an image forming apparatus normally has no information required for connection to the relay server of the sales organization that manages the image forming apparatus. For this reason, when, for example, initially placing the image forming apparatus, an operation of setting the information of a relay server by a serviceman is necessary. However, manually inputting the information of the relay server to the image forming apparatus requires a lot of time and effort of the serviceman. In addition, an input error may occur.

SUMMARY OF THE INVENTION

An aspect of the present invention is to eliminate the above-mentioned problems with conventional technology.

A feature of the present invention is to provide a technique that allows a first terminal and a second terminal to communicate via an appropriate relay server when the second terminal remote-controls the first terminal.

According to a first aspect of the present invention, there is provided a communication system including a first terminal and a second terminal, a management server configured to manage the first terminal and the second terminal, and a relay server configured to relay communication between the first terminal and the second terminal, wherein the management server includes at least one processor and at least one memory, the at least one processor and the at least one memory included in the management server acting as: a first notification unit configured to, when the first terminal is authenticated in response to an authentication request from the first terminal, notify the first terminal of first authentication information used by the first terminal to request the relay server to perform authentication and connection information used by the first terminal to connect to the relay server; and a second notification unit configured to, when the second terminal is authenticated in response to an authentication request from the second terminal, notify the second terminal of second authentication information used by the second terminal to request the relay server to perform authentication, and wherein the relay server includes at least one processor and at least one memory, the at least one processor and the at least one memory included in the relay server acting as: a first transmission unit configured to, in response to a request including the first authentication information from the first terminal, create access information used for the communication between the first terminal and the second terminal via the relay server and transmit the access information to the first terminal; a second transmission unit configured to transmit the access information to the second terminal in response to a request including the second authentication information from the second terminal; and a relay unit configured to relay the communication performed between the first terminal and the second terminal based on the access information.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a sequence chart for explaining communication between the MFP, the PC, the relay server, and the management server according to the first embodiment;

FIGS. 5A and 5B are flowcharts for describing processing executed by the MFP according to the first embodiment;

FIG. 19 is a flowchart for describing processing executed by the management server according to the third embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

[First Embodiment]

Figure 1:
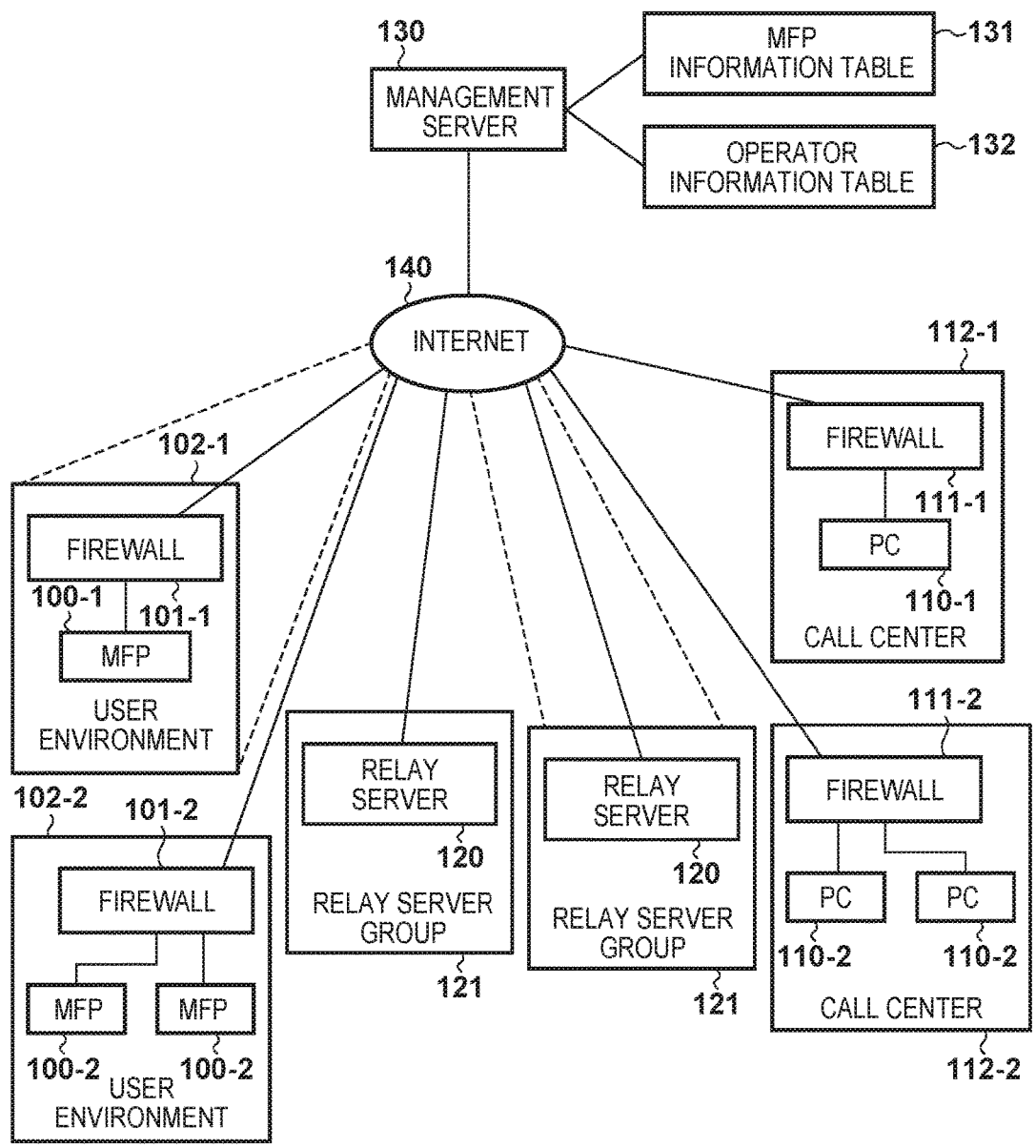
FIG. 1 depicts a view showing an example of the arrangement of a communication system capable of providing a secure remote support service via a network according to the first embodiment of the present invention.

FIG. 1 depicts a view for describing an example of the arrangement of a communication system capable of providing a secure remote support service via a network according to the first embodiment of the present invention.

MFPs 100-1 and 100-2 are arranged in user environments 102-1 and 102-2, respectively. The MFPs 100-1 and 100-2 are operated by users, and can access the Internet 140. Each MFP is an example of an image forming apparatus, which is a multi-function peripheral having a copy function, a scan function, a box function, a facsimile transmission/reception function, a print function, and the like.

PCs 110-1 and 110-2 are arranged in call centers 112-1 and 112-2, respectively. Each PC is an information processing apparatus operated by an operator in the call center. The call center is run for each sales organization of MFPs. There exist a plurality of user environments, call centers, MFPs, and PCs. In FIG. 1, the MFP 100-1 in the user environment 102-1 is maintained and operated by the call center 112-1 and receives remote support by the operator of the PC 110-1. Similarly, the MFP 100-2 in the user environment 102-2 is maintained and operated by the call center 112-2 and receives remote support by the operator of the PC 110-2. A description will be made assuming that an MFP is arranged in each user environment in FIG. 1. However, another information processing apparatus may be further arranged. Another information processing apparatus may be, for example, a PC, a server apparatus, or a tablet terminal.

Firewalls 101-1 and 101-2 are placed in the user environments 102-1 and 102-2, respectively. Firewalls 111-1 and 111-2 are placed in the call centers 112-1 and 112-2, respectively. The firewalls 101-1 and 101-2 permit connection from terminals inside the user environments 102-1 and 102-2 to the Internet 140 but reject connection from the Internet 140 to the terminals inside the user environments 102-1 and 102-2. The firewalls 111-1 and 111-2 permit connection from terminals inside the call centers 112-1 and 112-2 to the Internet 140 but reject connection from the Internet 140 to the terminals inside the call centers 112-1 and 112-2.

A relay server group 121 is a server group formed from a server computer that provides a relay service via the Internet 140. The relay server group 121 may be formed from one relay server or a plurality of relay servers. FIG. 1 shows a case in which the relay server group 121 included one relay server 120. The MFPs and the PCs have a data communication function by HTTP (Hyper Text Transfer Protocol). The HTTP is a client/server type protocol defined by RFC (Request For Comment) 2616, and a plurality of methods are usable. In general, when a client (MFP or PC) receives information from a server, a GET method is used. When a client transmits information to a server, a POST method is used.

The embodiments of the present invention will be described below while defining the MFPs 100-1 and 100-2 as the MFP 100 and the PCs 110-1 and 110-2 as the PC 110 if it is unnecessary to distinguish the MFPs by the user environments to which they belong or the PCs by the call centers.

Figure 3:
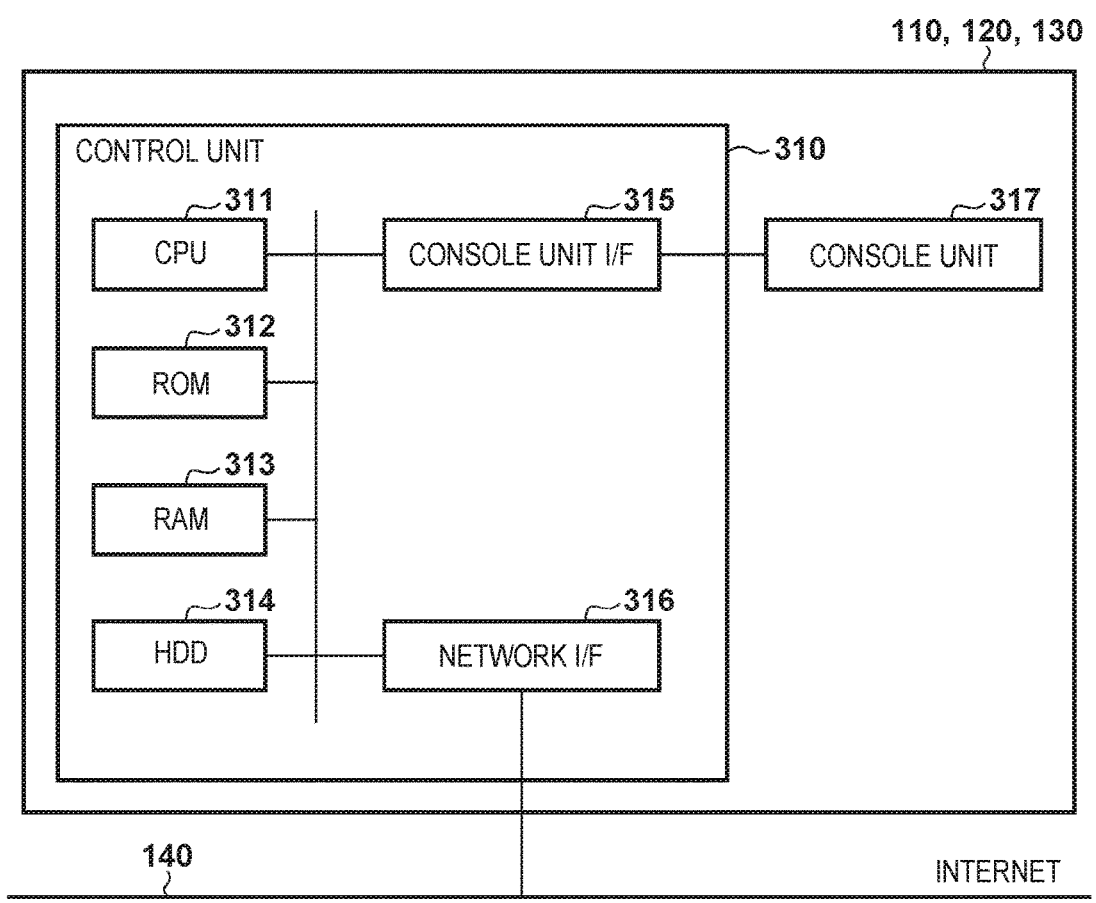
FIG. 3 is a block diagram for describing the hardware arrangement of a PC, a relay server, and a management server according to the first embodiment.

In the first embodiment, communication between the MFP 100 and the PC 110 is implemented using the GET method and the POST method. That is, when transmitting data such as a moving image, a voice, or remote control information from the PC 110 to the MFP 100, first, the PC 110 transmits a POST request of data to the relay server 120, and the relay server 120 buffers the data in a RAM 313 (FIG. 3). When the MFP 100 then transmits a GET request to the relay server 120, the relay server 120 returns the data buffered in the RAM 313 to the MFP 100 as a response.

On the other hand, when transmitting data from the MFP 100 to the PC 110, the MFP 100 transmits a POST request of data to the relay server 120, and the relay server 120 receives the data and buffers it in the RAM 313. When the PC 110 then transmits a GET request to the relay server 120, the relay server 120 returns the data buffered in the RAM 313 to the PC 110 as a response. This allows the user of the MFP 100 to receive support by a voice, moving image communication, or remote control from the operator of the PC 110 even in the environment with the firewalls 101-1, 101-2, 111-1, and 111-2. Note that in the first embodiment, various kinds of data transmitted/received between the PC 110 and the MFP 100 by the operator of the PC 110 to support the user of the MFP 100 will be referred to as "support data".

When the MFP 100 or the PC 110 transmits a POST request or GET request to the relay server 120, a common URL (Uniform Resource Locator) needs to be designated. This URL will be referred to as a "support URL". The support URL is access information to the relay server 120, which is necessary for the MFP 100 and the PC 110 to communicate via the relay server 120. The support URL needs to be common to the MFP 100 to be supported and the PC 110 that supports. The support URL needs to be shared between the MFP 100 and the PC 110 before the start of communication of support data. For example, when remote support for the MFP 100-1 is done from the call center 112-1, the MFP 100-1 and the PC 110-1 need to share a support URL in advance. Note that this support URL needs to be different from the support URL used for communication between the MFP 100-2 and the PC 110-2. In addition, since the number of support URLs assignable by the relay server 120 is limited, the support URL is preferably assigned every time support is required instead of setting a fixed support URL for the MFP 100 and the PC 110 in advance. The support URL is expressed as, for example, https://xxxxcallcenter.com/servlet/URLInterface.

The MFP 100 incorporates a module configured to monitor the MFP 100 itself. This module monitors the status of the MFP 100, and notifies a management server 130 of the state of the MFP 100. The management server 130 is placed on the Internet 140 and communicates with the monitoring modules in the MFPs 100-1 and 100-2 placed in the user environments 102-1 and 102-2, thereby collecting and managing the information of the MFPs.

An MFP information table 131 stores information representing the correspondence between the MFP 100 and each call center, and is held by the management server 130. By referring to the MFP information table 131, transmission of the use state of each MFP or emergency contact in case of a failure can be done for an appropriate call center. The MFP information table 131 also includes information representing which relay server is to be connected to each MFP. When starting the remote maintenance service, the relay server information set in the MFP information table 131 is obtained. Details of the MFP information table 131 will be described later with reference to FIG. 9. A method of setting, for each call center, the information of the relay server 120 set in the MFP information table 131 will also be described later with reference to FIG. 9.

By the MFP information table 131, the basic use state of each MFP or emergency contact in case of a failure can be provided to the corresponding call center. The management server 130 also includes an operator information table 132 that manages the operator information of each call center. The operator information table 132 stores the ID, password, name, mail address, and telephone number of each operator and the ID, name, and mail address of the call center to which the operator belongs. Details of the operator information table 132 will be described later with reference to FIG. 10.

The management server 130 confirms, by referring to the MFP information table 131 and the operator information table 132 in the management server 130, whether or not the MFP 100 or the PC 110 that has transmitted an authentication request is registered in the management server 130, and transmits the confirmation result as an authentication token. The relay server 120 verifies the authentication token, thereby determining whether or not it is a correct authentication token issued by the management server 130. The management server 130 can also confirm, by referring to the MFP information table 131, whether or not the MFP 100 that has issued an authentication request has a specific contract, and transmit the confirmation result as an authentication token.

Figure 2:
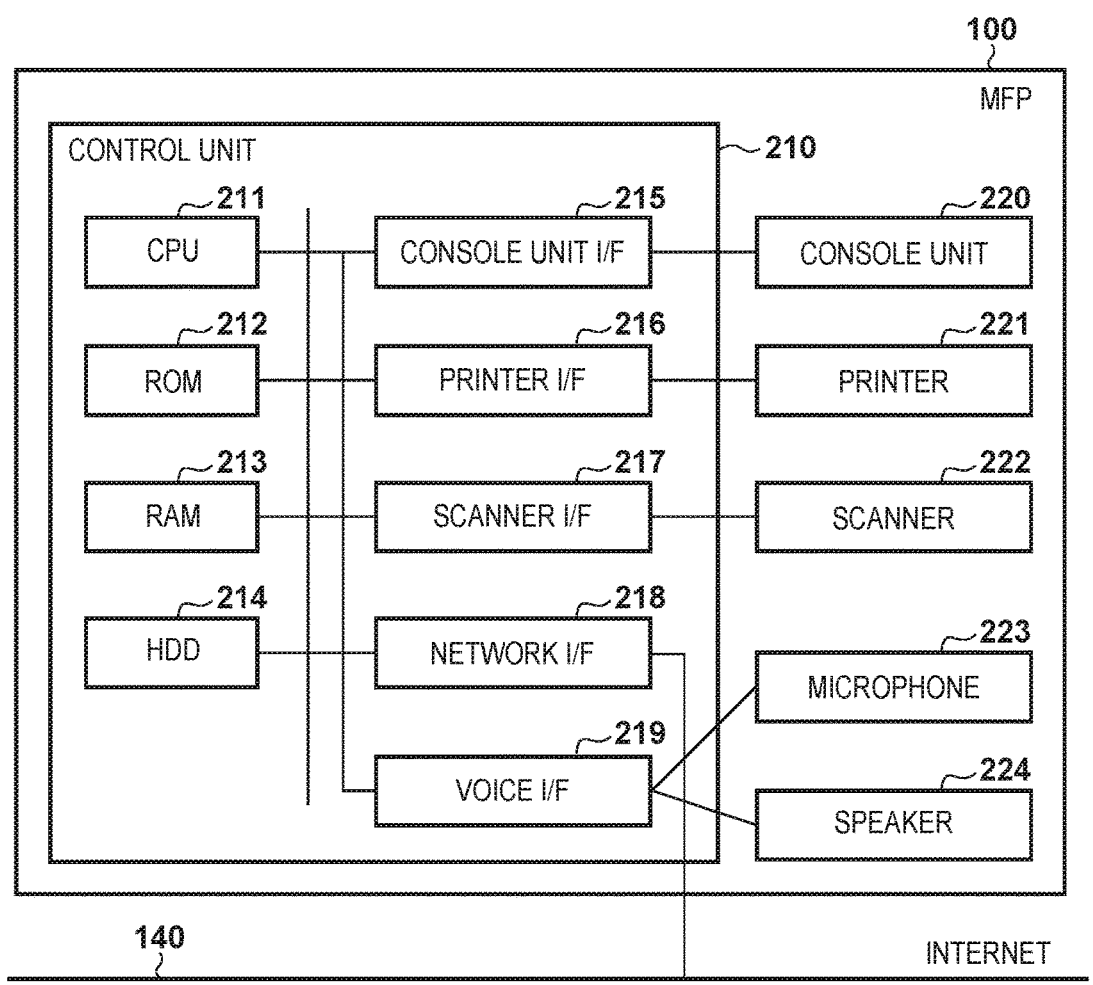
FIG. 2 is a block diagram for describing the hardware arrangement of an MFP according to the first embodiment.

FIG. 2 is a block diagram for describing the hardware arrangement of the MFP 100 according to the first embodiment of the present invention.

A control unit 210 including a CPU 211 controls the operation of the entire MFP 100. The CPU 211 deploys a program stored in an HDD 214 into a RAM 213 by a boot program stored in a ROM 212, and executes it to perform various kinds of control such as reading of originals, printing, and transmission control. The RAM 213 is used as a temporary storage area such as the main memory or work area of the CPU 211. Note that in the MFP 100, one CPU 211 executes the processes of flowcharts to be described later using one memory (the RAM 213 or the HDD 214). However, another form is also possible. For example, the processes of flowcharts to be described later may be executed by making a plurality of CPUs or a plurality of RAMs or HDDs cooperate. The HDD 214 stores image data and various kinds of programs. A console unit I/F 215 connects a console unit 220 and the control unit 210. The console unit 220 is provided with a display unit having a touch panel function, a keyboard, and the like. A printer I/F 216 connects a printer 221 and the control unit 210. Image data to be printed by the printer 221 is transferred from the control unit 210 to the printer 221 via the printer I/F 216 and printed on a print medium (sheet) by the printer 221. A scanner I/F 217 connects a scanner 222 and the control unit 210. The scanner 222 reads an image of an original to generate image data, and inputs the image data to the control unit 210 via the scanner I/F 217. The MFP 100 can perform file transmission or mail transmission of the image data (image file) generated by the scanner 222. A network I/F 218 connects the MFP 100 to the Internet 140. A voice I/F 219 connects a microphone 223 and a speaker 224 to the control unit 210, and inputs a voice signal input from the microphone 223 to the control unit 210. The voice I/F 219 also outputs a voice signal from the control unit 210 to the speaker 224 to generate a voice. When the operator of the PC 110 supports the user of the MFP 100, the microphone 223 and the speaker 224 are used to give an instruction of the operator to the user and also give a query or the like of the user to the operator.

FIG. 3 is a block diagram for describing the hardware arrangement of the PC 110, the relay server 120, and the management server 130 according to the first embodiment. The PC 110, the relay server 120, and the management server 130 have the same arrangement as, for example, a general PC, and the arrangement shown in FIG. 3 will representatively be described.

A control unit 310 including a CPU 311 controls the operation of the entire apparatus. The CPU 311 executes a boot program stored in a ROM 312, deploys a program stored in an HDD 314 into the RAM 313, and executes it to execute various kinds of control processing. The RAM 313 is used as a temporary storage area such as the main memory or work area of the CPU 311. The HDD 314 stores image data and various kinds of programs. A console unit I/F 315 connects a console unit 317 and the control unit 310. The console unit 317 is provided with a display unit having a touch panel function, a keyboard, a pointing device, and the like. A network I/F 316 controls communication with the Internet 140.

FIG. 4 is a sequence chart for explaining communication between the MFP 100, the PC 110, the relay server 120, and the management server 130 according to the first embodiment. The operation shown in this sequence chart is implemented when the CPU 211 of the MFP 100 executes a program deployed from the HDD 214 to the RAM 213. The processing of each of the PC 110, the relay server 120 and the management server 130 is implemented when the CPU 311 of the apparatus executes a program deployed from the HDD 314 to the RAM 313.

When the user inputs a support start request via the console unit 220, the MFP 100 transmits an authentication request to the management server 130 together with the identifier of the MFP in step S401. Note that the support start request may be executed when the user presses a support start button displayed on the console unit 220 of the MFP 100, or when the user performs a specific operation by a hard button of the console unit 220. The identifier of the MFP is a unique identifier all over the world used to specific the MFP 100, and is, for example, the serial number of the MFP 100.

As described above, the management server 130 includes the MFP information table 131 that associates the MFP 100 with a call center. Based on the received identifier of the MFP, the management server 130 determines, by referring to the MFP information table 131, whether or not the MFP 100 is an MFP managed by the management server 130. If the MFP 100 is a management target, the management server 130 transmits an authentication token to the MFP 100 in step S402. In step S404 later, the relay server 120 verifies the authentication token (authentication information) from the MFP 100, thereby rejecting a connection request from an MFP unmanaged by the management server 130. In step S403, the management server 130 obtains the URL of the relay server 120 from the MFP information table 131 based on the received identifier of the MFP, and transmits the URL to the MFP 100.

In step S404, the MFP 100 issues an authentication token verify request to the URL of the relay server 120 received in step S403. In step S405, the relay server 120 returns a session ID as a verify result to the MFP 100. The session ID is data that certifies the success of login to the relay server 120 and is transferred to the relay server 120 when requesting support URL creation. The MFP 100 thus receives connection information to the relay server 120 from the management server 130, thereby obtaining connection information to the appropriate relay server 120. After that, a session to create a support URL and a serial number used by the MFP 100 to receive support from the PC 110 is executed between the MFP 100 and the relay server 120.

In step S406, the MFP 100 transmits the session ID and a support URL creation request to the relay server 120. In step S407, the relay server 120 creates a support URL and a serial number having a one-to-one correspondence with the support URL. In step S408, the relay server 120 transmits the created support URL to the MFP 100. In step S409, the MFP 100 transmits a join request to the support URL. The MFP 100 is thus allowed to communicate with the relay server 120.

Upon receiving the join request to the support URL from the MFP 100, the relay server 120 buffers the information of the MFP 100 as a participant in the RAM 313. Upon receiving a GET request of participant information to the support URL from the MFP 100 or the PC 110, the relay server 120 returns the updated information of the participant buffered in the RAM 313 to the MFP 100 or the PC 110, as will be described later. Additionally, upon receiving a drop-out request to the support URL from the MFP 100 or the PC 110, the relay server 120 deletes the information from the participant information buffered in the RAM 313.

In step S410, the relay server 120 transmits the serial number created in step S407 to the MFP 100. Note that the relay server 120 creates the serial number in accordance with acceptance of a request to support remote control from the MFP 100. The serial number is acceptance information representing that the relay server 120 has approved the acceptance, and may include not only a number but also a character. Since the serial number issued in step S410 has a one-to-one correspondence with the support URL created by the relay server 120, the relay server 120 saves the created support URL and the serial number in the RAM 313 in association with each other. Hence, the support URL can be obtained based on the serial number.

In step S411, the MFP 100 displays, on the console unit 220, the serial number transferred from the relay server 120. In step S412, the MFP 100 periodically transmits the GET request of the participant information to the support URL.

On the other hand, from the process of step S413, the PC 110 in the call center obtains an authentication token from the management server 130, obtains the support URL from the relay server 120 based on the authentication token, and exchanges support data with the MFP 100. This will be described below in detail.

In step S413, to connect with the relay server 120, the PC 110 transmits a user name and a password to the management server 130 to request authentication. In step S414, the management server 130 determines whether or not the user of the PC 110 is registered in the operator information table 132 of the management server 130, and verifies the password. If the password is correct, the management server 130 transmits an authentication token to the PC 110. The PC 110 thus obtains the authentication token and transmits an authentication token verify request to the relay server 120 in step S415. In step S416, the relay server 120 returns a session ID as a verify result to the PC 110. In step S417, the PC 110 transmits a support URL acquisition request and the session ID to the relay server 120. At this time, the operator of the PC 110 knows the ULR of the relay server 120 but not the support URL created in step S407. Hence, to specify the support URL, the operator of the PC 110 obtains the serial number displayed on the console unit 220 of the MFP 100 in step S411 from the user of the MFP 100, and inputs it to the PC 110. In step S418, the PC 110 transmits the input serial number to the relay server 120. Note that the serial number displayed on the console unit 220 of the MFP 100 can be given to the operator of the PC 110 by telephone, IP telephone using the microphone 223 and the speaker 224, or email. The relay server 120 obtains a serial number that matches the serial number input in step S418 out of serial numbers saved in the RAM 313. In step S419, the relay server 120 transmits the support URL corresponding to the serial number to the PC 110. In step S420, the PC 110 issues a support join request to the relay server 120. Upon receiving the request, the relay server 120 buffers the information of the PC 110 as a participant in the RAM 313. The MFP 100 and the PC 110 can thus exchange support data.

In step S421, the relay server 120 transmits participant information to the MFP 100 as a response to the GET request that has started being transmitted from the MFP 100 in step S412. The MFP 100 can thus grasp that the PC 110 is selected as an apparatus to support itself. In steps S422 and S423, the MFP 100 and the PC 110 periodically transmit a POST request and a GET request to the assigned support URL, thereby communicating support data via the relay server 120. Examples of support data are a moving image, a voice, instruction data for remote control, and data held by the MFP 100. Note that the data held by the MFP 100 includes operation information such as a counter value, an operation log, and a part counter value representing the consumed level of each part used in the MFP 100 and failure information such as a hardware failure and jam. For example, if a failure such as a jam error occurs in the MFP 100, and the user cannot recover from the failure, failure information is notified from the MFP 100 to the operator in the call center 112 to find the cause. In this case, when the MFP 100 posts information representing the failure to the support URL, the relay server 120 stores the information in the RAM 313. After that, when the PC 110 in the call center 112 transmits a GET request to the support URL, the relay server 120 transmits the information stored in the RAM 313 to the PC 110 as a response. Then, the operator in the call center 112 grasps the cause of the failure based on the information transmitted from the MFP 100, and gives an error recovery method to the user of the MFP 100 by a moving image. In this case, when the operator in the call center 112 transmits a POST request of moving image data to the support URL by operating the PC 110, the relay server 120 stores the moving image data in the RAM 313. After that, when the MFP 100 transmits a GET request to the support URL, the moving image data stored in the RAM 313 of the relay server 120 is transmitted to the MFP 100.

When the operation by the user of the MFP 100 ends, the MFP 100 transmits a dropout request to the support URL (relay server 120) in step S424. In addition, since the support to the MFP 100 by the operator of the PC 110 ends, the PC 110 transmits a dropout request to the support URL (relay server 120) in step S425. In step S426, the relay server 120 discards the support URL and the serial number which are no longer needed, and ends the processing.

Note that an example in which the MFP 100 is connected to the relay server 120 first, and after that, the PC 110 is connected to the relay server 120 has been described here. However, the PC 110 may be connected to the relay server 120 first, and after that, the MFP 100 may be connected to the relay server 120.

Figure 5A:
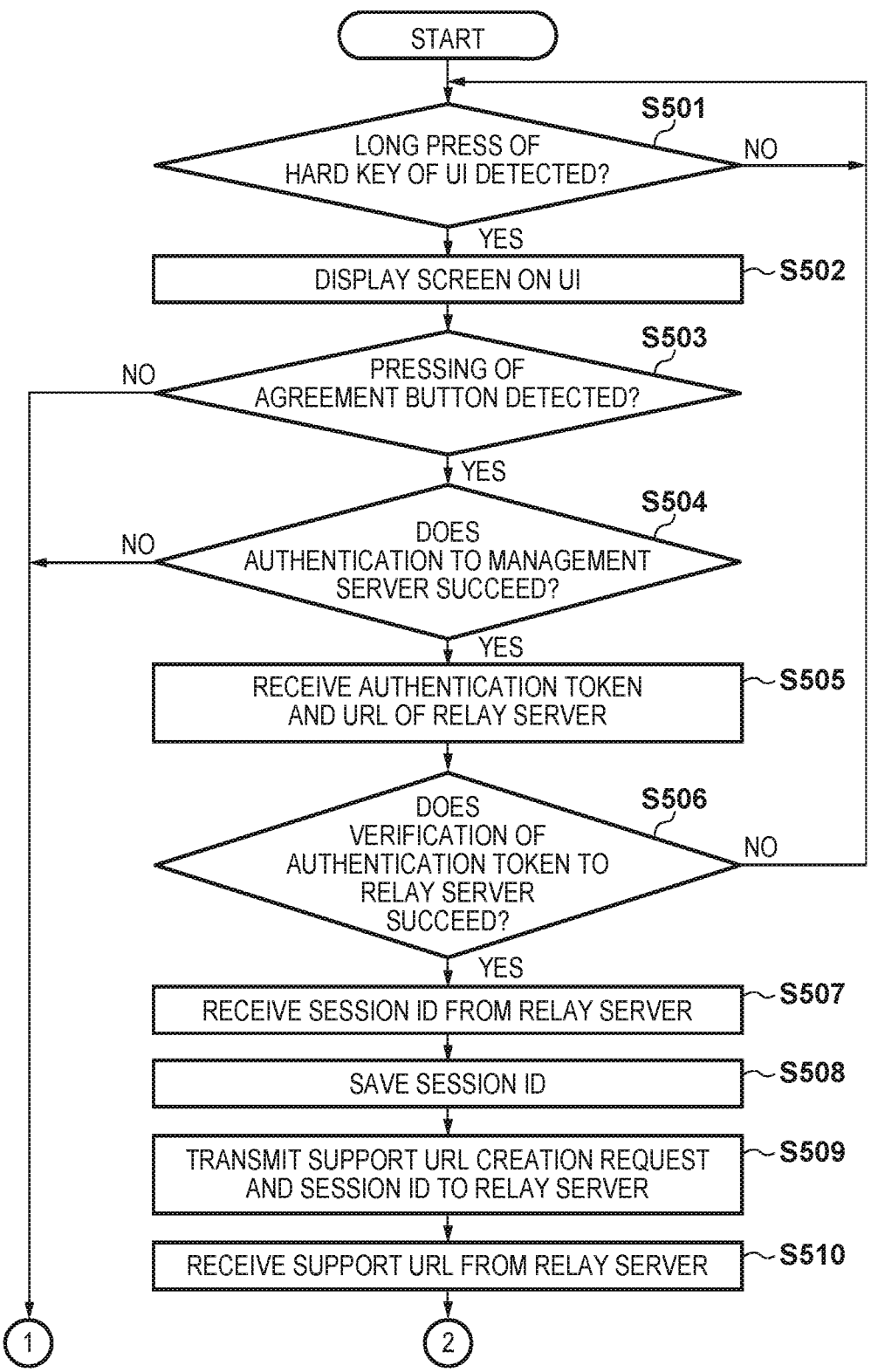

FIGS. 5A and 5B are flowcharts for describing processing executed by the MFP 100 according to the first embodiment. Note that each operation (step) shown in this flowchart is implemented when the CPU 211 of the MFP 100 deploys a program stored in the HDD 214 into the RAM 213 and executes it.

In step S501, the CPU 211 detects that a specific hard key of the console unit 220 of the MFP 100 is long-pressed to instruct to start the remote maintenance service. Note that in the first embodiment, the long press of the hard key of the console unit 220 is used as the trigger to the start of the remote maintenance service. However, the trigger may be the pressing of a button displayed on the console unit 220 or the pressing of a dedicated hard key of the console unit 220. Alternatively, a specific procedure of operating a hard key of the console unit 220 may be used as the trigger. When the CPU 211 detects the long press of the hard key of the console unit 220 in step S501, the process advances to step S502. To start the remote maintenance service, the CPU 211 displays, on the console unit 220, a screen to confirm whether the MFP can be connected to the relay server 120. Note that this screen may be displayed only once when the MFP 100 uses the remote maintenance service for the first time or displayed every time. The screen may be hidden by the setting of the MFP 100.

The process advances to step S503. When the CPU 211 detects the pressing of the agreement button on the screen displayed on the console unit 220 in step S502, the process advances to step S504. If the user does not agree, the processing ends. In step S504, the CPU 211 transmits an authentication request and the identifier of the MFP 100 to the management server 130 to issue the authentication request, and consequently determines whether or not the authentication succeeds. If the authentication fails, the processing ends. If the authentication succeeds, the process advances to step S505, and the CPU 211 receives an authentication token and the URL of the relay server 120 from the management server 130.

The process advances to step S506, and the CPU 211 issues a verify request of the authentication token received in step S505 to the relay server 120 using the URL of the relay server 120 received in step S505. If the verify result of the authentication token is correct in step S506, the process advances to step S507, and the CPU 211 receives a session ID from the relay server 120. The process advances to step S508, and the CPU 211 saves the received session ID in the RAM 213. The process then advances to step S509. On the other hand, if the authentication token is not correct as the result of verification in step S506, the process returns to step S501, or the processing ends.

In step S509, the CPU 211 transmits a support URL creation request and the session ID saved in the RAM 213 to the relay server 120. Accordingly, the relay server 120 creates a support URL and a serial number and transmits them to the MFP 100. In step S510, the CPU 211 receives the support URL from the relay server 120. The process advances to step S511, and the CPU 211 issues a join request to the support URL (relay server 120). The process then advances to step S512. In step S512, the CPU 211 receives the serial number from the relay server 120. The process advances to step S513, and the CPU 211 displays the received serial number on the console unit 220. To specify the support URL of the relay server 120, the PC 110 inputs the serial number. Hence, the displayed serial number is given to the operator of the PC 110 by telephone or mail, as described above.

Next, the process advances to step S514, and the CPU 211 starts periodically transmitting a GET request of participant information to the support URL. In step S515, the CPU 211 receives the participant information from the relay server 120. The process advances to step S516, and the CPU 211 starts transmitting/receiving support data via the relay server 120 (steps S422 and S423 in FIG. 4). More specifically, as described above, the CPU 211 transmits a POST request and a GET request of support data to the support URL, thereby receiving support data transmitted from the PC 110 or transmitting support data to the PC 110. The user of the MFP 100 can thus receive support by a voice, moving image communication, or remote control from the operator of the PC 110.

When support from the PC 110 ends, in step S517, the CPU 211 waits for acceptance of input of a support stop request from the console unit 220. Upon accepting input of a support stop request from the console unit 220, the process advances to step S518, and the CPU 211 transmits a dropout request to the support URL. The process then advances to step S519. In step S519, the CPU 211 discards the session ID saved in the RAM 213, and ends the processing.

Figure 6:
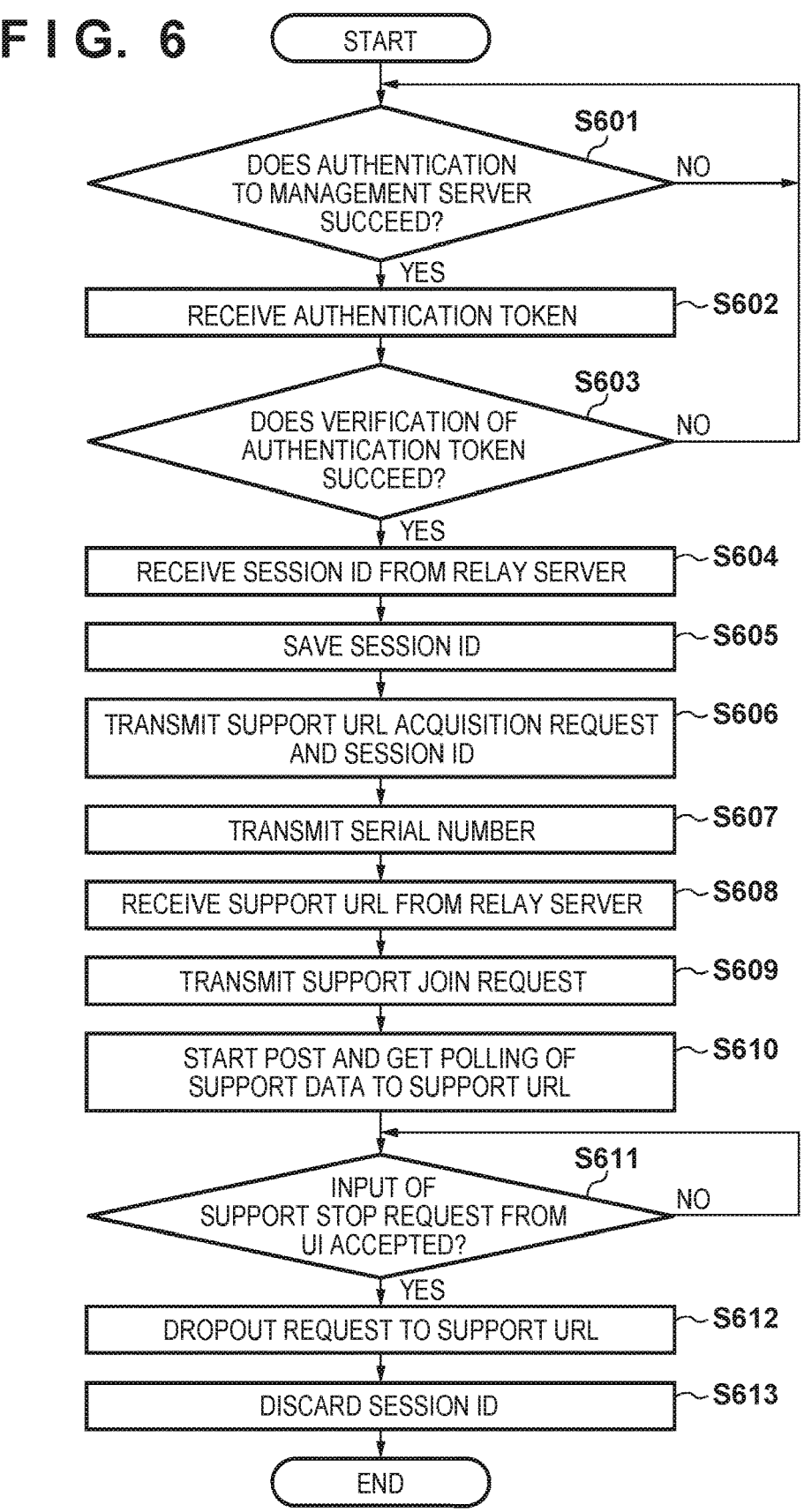
FIG. 6 is a flowchart for describing processing executed by the PC according to the first embodiment.

FIG. 6 is a flowchart for describing processing executed by the PC 110 according to the first embodiment. Note that each operation (step) shown in this flowchart is implemented when the CPU 311 of the PC 110 deploys a program stored in the HDD 314 into the RAM 313 and executes it.

In step S601, the CPU 311 issues an authentication request to the management server 130. At this time, a user name and a password input via the console unit 317 are transmitted to the management server 130. If the authentication fails in step S601, the process returns to step S601, or the processing ends. If the authentication succeeds in step S601, the process advances to step S602, and the CPU 311 receives an authentication token from the management server 130. The process advances to step S603, and the CPU 311 issues a verify request of the authentication token received in step S602 to the relay server 120. If the authentication token is correct as the result of verification by the relay server 120, the process advances to step S604, and the CPU 311 receives a session ID from the relay server 120. The process then advances to step S605, and the CPU 311 saves the received session ID in the RAM 313.

Next, the process advances to step S606, and the CPU 311 transmits a support URL acquisition request and the session ID to the relay server 120. The process advances to step S607, and the CPU 311 transmits a serial number input by the operator via the console unit 317 to the relay server 120. Note that the serial number input here is the serial number displayed on the console unit 220 of the MFP 100 in step S513 of FIG. 5B, as described above. The serial number is used by the relay server 120 to specify the already connected MFP 100 and select the support URL of the relay server 120, and given by the user of the MFP 100 to the operator of the PC 110 by telephone or mail, as described above.

The process advances to step S608, and the CPU 311 receives the support URL from the relay server 120. The process advances to step S609, and the CPU 311 transmits a support join request to the relay server 120. In step S610, the CPU 311 starts transmitting/receiving support data via the relay server 120. More specifically, as described above, the CPU 311 transmits a POST request and a GET request of support data to the support URL, thereby receiving support data transmitted from the MFP 100 or transmitting support data to the MFP 100. Support data exchange between the PC 110 and the MFP 100 is thus executed.

When support from the PC 110 to the MFP 100 ends, in step S611, the CPU 311 waits for acceptance of input of a support stop request from the console unit 317 of the PC 110. Upon accepting the support stop request, the process advances to step S612, and the CPU 311 transmits a dropout request to the support URL (relay server 120). The process then advances to step S613, and the CPU 311 discards the session ID saved in the RAM 313, and ends the processing.

Figure 7A:
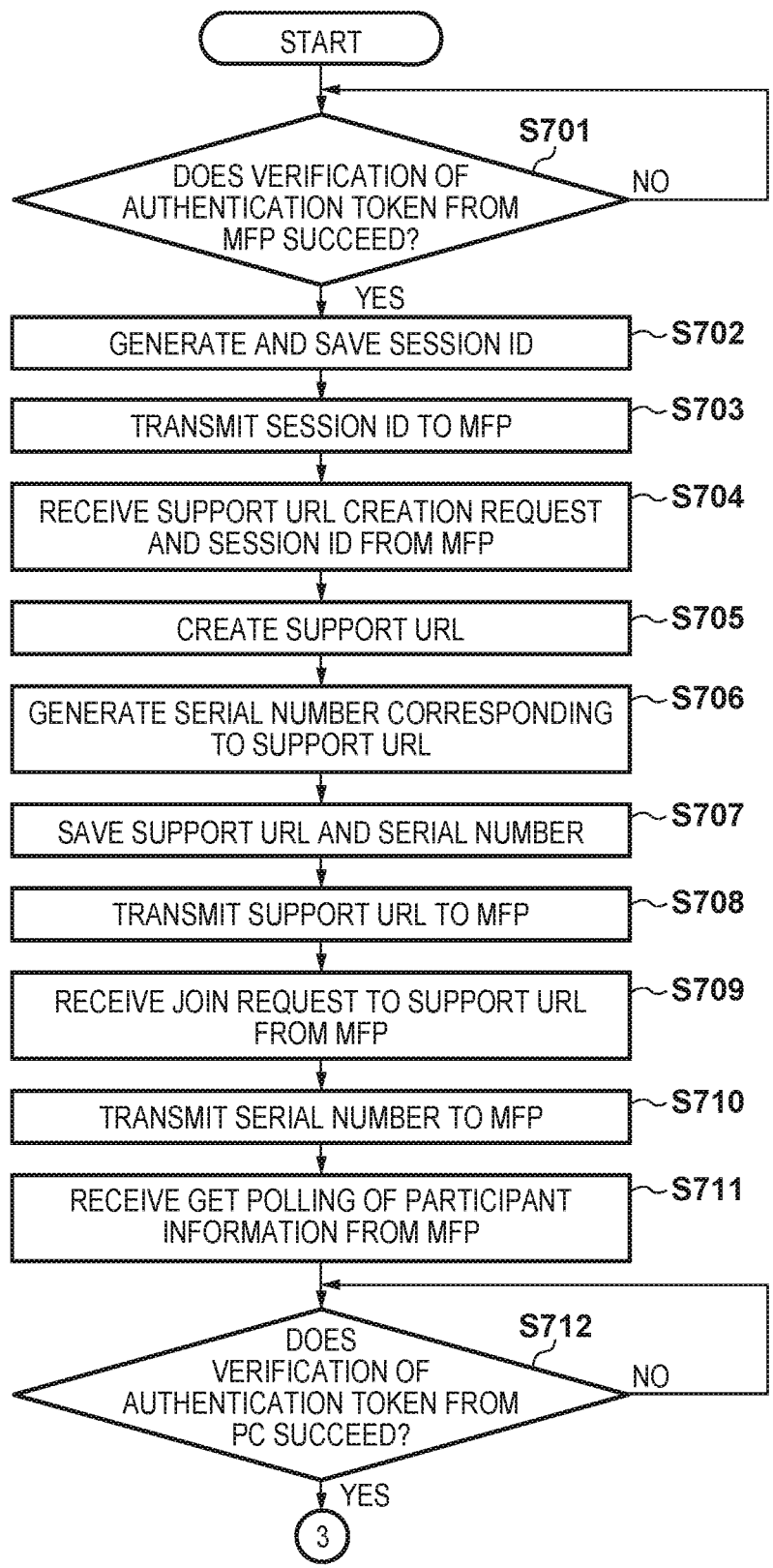
FIGS. 7A and 7B are flowcharts for describing processing executed by the relay server according to the first embodiment.
Figure 7B:
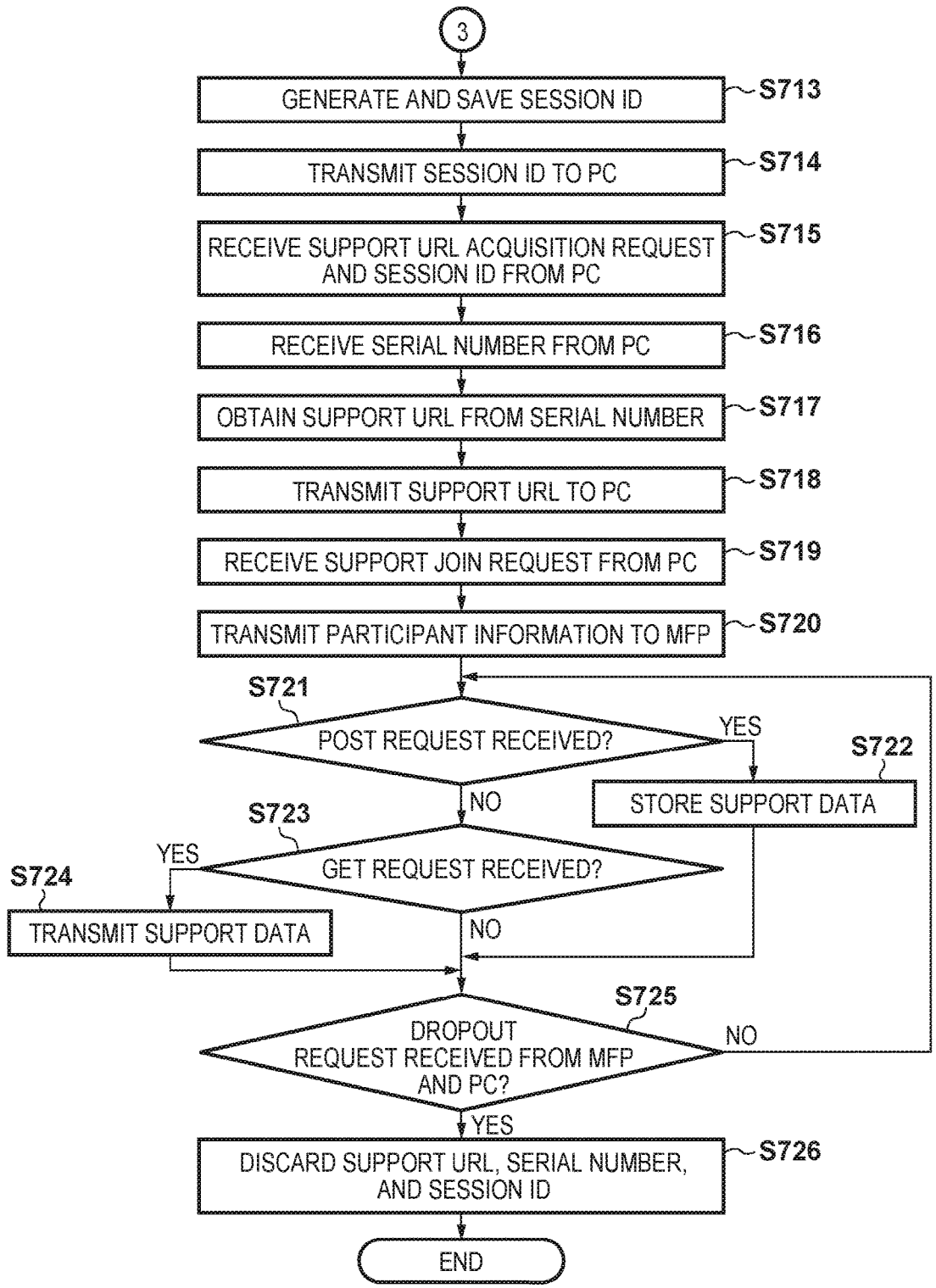

FIGS. 7A and 7B are flowcharts for describing processing executed by the relay server 120 according to the first embodiment. Note that each operation (step) shown in this flowchart is implemented when the CPU 311 of the relay server 120 deploys a program stored in the HDD 314 into the RAM 313 and executes it.

In step S701, the CPU 311 receives an authentication token verify request from the MFP 100 and verifies it. In this verification, the CPU 311 verifies whether or not the received authentication token is an authentication token issued by the management server 130. If the verify result of the authentication token is correct, the process advances to step S702, and the CPU 311 creates and saves a session ID to the MFP 100. The session ID is data that certifies the success of login to the relay server 120. The process advances to step S703, and the CPU 311 transmits the session ID to the MFP 100. Note that if the verify result is not correct in step S701, the process returns to step S701.

In step S704, the CPU 311 receives a support URL creation request and a session ID from the MFP 100. The process advances to step S705. In step S705, the CPU 311 determines whether or not the received session ID matches the session ID saved in the RAM 313, and if the session IDs match, creates a support URL. The process advances to step S706, and the CPU 311 generates a serial number having a one-to-one correspondence with the support URL. The process advances to step S707, and the CPU 311 saves the created support URL and the serial number in the RAM 313 in association with each other (corresponding to step S407 of FIG. 4). The support URL corresponding to the serial number can be obtained by referring to the serial number saved in the RAM 313. Note that in this embodiment, the serial number may be a number or a character. To reduce the risk of input of a wrong serial number by an operation error, a random number may be used as the serial number.

Next, the process advances to step S708, and the CPU 311 transmits the support URL to the MFP 100. The process advances to step S709, and the CPU 311 receives a join request to the support URL from the MFP 100. The process advances to step S710, and the CPU 311 transmits the serial number created in step S706 to the MFP 100. The serial number is thus displayed on the console unit 220 of the MFP 100. The process advances to step S711, and the CPU 311 receives a GET request of participant information from the MFP 100. Then, the process advances to step S712.

In step S712, the CPU 311 receives an authentication token verify request from the PC 110 and verifies it. If the verification of the authentication token from the PC 110 succeeds, the process advances to step S713, and the CPU 311 generates a session ID and saves it in the RAM 313. This session ID has a value different from that of the session ID generated in step S702, and the session IDs are saved in the RAM 313 of the relay server 120. The process advances to step S714, and the CPU 311 transmits the session ID to the PC 110. The process advances to step S715, and the CPU 311 receives a URL acquisition request and a session ID from the PC 110. The process advances to step S716. In step S716, the CPU 311 determines whether or not the session ID received in step S715 is the same as the session ID saved in the RAM 313 of the relay server 120 in step S713. If the session IDs are the same, the CPU 311 receives a serial number from the PC 110. The process advances to step S717, and using the serial number received in step S716, the CPU 311 obtains a support URL from the pair of the serial number and the support URL saved in the RAM 313. The process advances to step S718, and the CPU 311 transmits the obtained support URL to the PC 110. The process advances to step S719, and the CPU 311 receives a support join request from the PC 110.

The process advances to step S720, the CPU 311 transmits participant information to the MFP 100 as a response to the GET request received in step S711. This allows the MFP 100 and the PC 110 to transmit/receive support data via the relay server 120. If a POST request of support data is received from the MFP 100 or the PC 110 in step S721, the CPU 311 stores the support data in the RAM 313 in step S722, and the process advances to step S725. If a GET request of support data is received from the MFP 100 or the PC 110 in step S723, the support data stored in the RAM 313 is transmitted to the request source in step S724, and the process advances to step S725. The support data is thus transmitted/received between the MFP 100 and the PC 110, and the operator of the PC 110 can support the user of the MFP 100.

When support by the operator of the PC 110 ends, the process advances to step S725, and the CPU 311 waits until a dropout request is transmitted from each of the MFP 100 and the PC 110 to the support URL and received. Upon receiving the dropout request, the process advances to step S726. The CPU 311 discards the support URL, the serial numbers, and the session ID saved in the RAM 313, and ends the processing.

Figure 8:
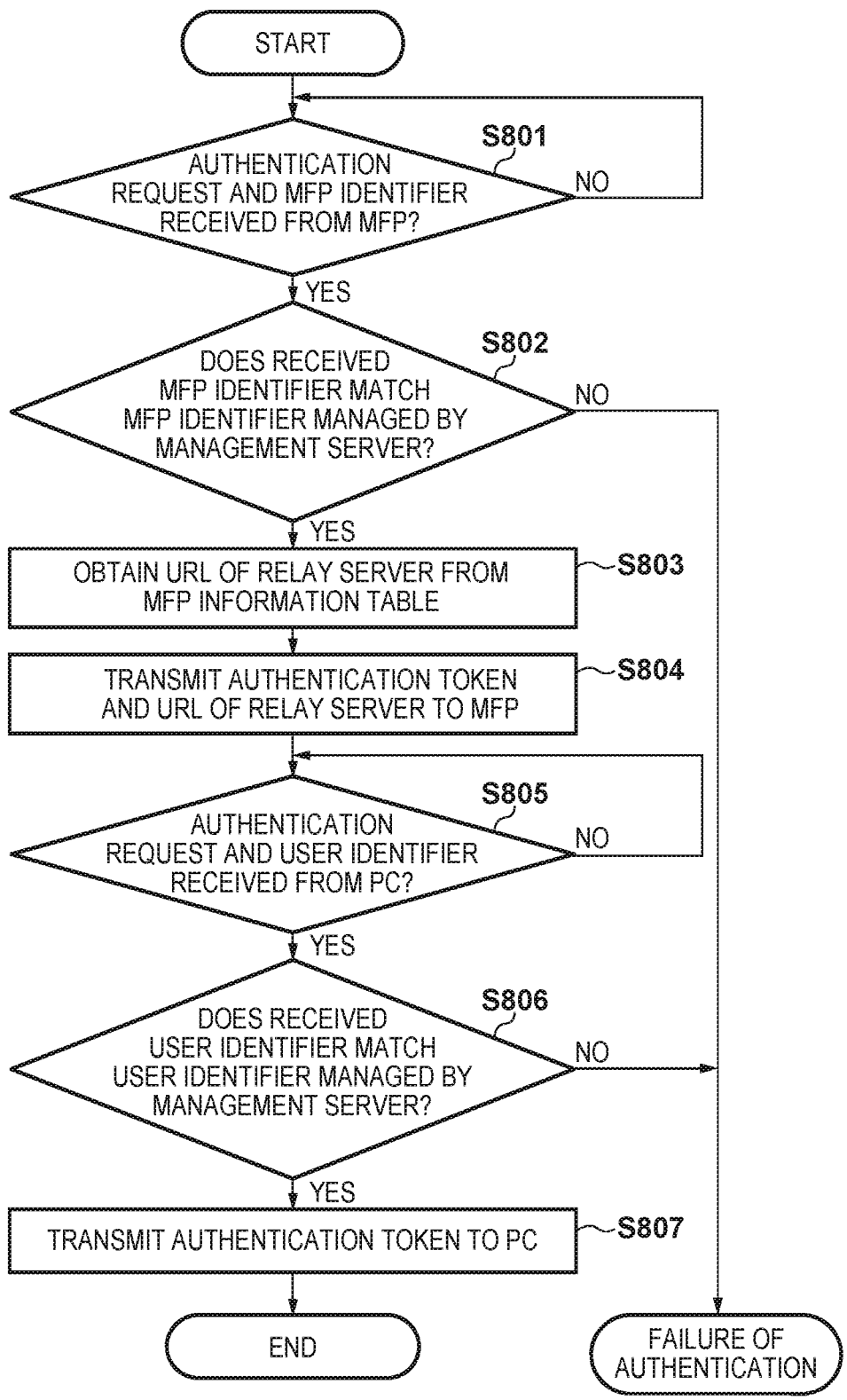
FIG. 8 is a flowchart for describing processing executed by the management server according to the first embodiment.

FIG. 8 is a flowchart for describing processing executed by the management server 130 according to the first embodiment. Note that each operation (step) shown in this flowchart is implemented when the CPU 311 of the management server 130 deploys a program stored in the HDD 314 into the RAM 313 and executes it.

In step S801, the CPU 311 waits for reception of an authentication request and an MFP identifier from the MFP 100. The MFP identifier is a value capable of identifying each MFP, for example, the serial number of the MFP 100. Upon receiving the authentication request and the MFP identifier, the process advances to step S802, and the CPU 311 determines whether or not the received MFP identifier is included in the MFP information table 131 of the management server 130. If the MFP identifier is not included, the MFP is not a management target. The authentication fails, and the processing ends. On the other hand, if the received MFP identifier is included in the MFP information table 131, the process advances to step S803, and the CPU 311 obtains, from the MFP information table 131, which relay server 120 should be connected to the MFP 100 having the MFP identifier. The process advances to step S804, and the CPU 311 transmits an authentication token as the authentication result and the URL of the relay server obtained in step S803 to the MFP 100. The MFP 100 can thus obtain the URL of the appropriate relay server 120 to be connected.

Next, the process advances to step S805, and the CPU 311 waits for reception of an authentication request and a user identifier from the PC 110. The user identifier is a value capable of identifying each user, for example, a user name and a password. When the CPU 311 receives the authentication request and the user identifier in step S805, the process advances to step S806, and the CPU 311 determines whether or not the received user identifier is included in the operator information table 132 of the management server 130. Upon determining that the user identifier is not included, the authentication fails, and the processing ends. On the other hand, if the user identifier is included in the operator information table 132, the process advances to step S807. The CPU 311 transmits an authentication token as the authentication result to the PC 110, and ends the processing.

Figure 9:
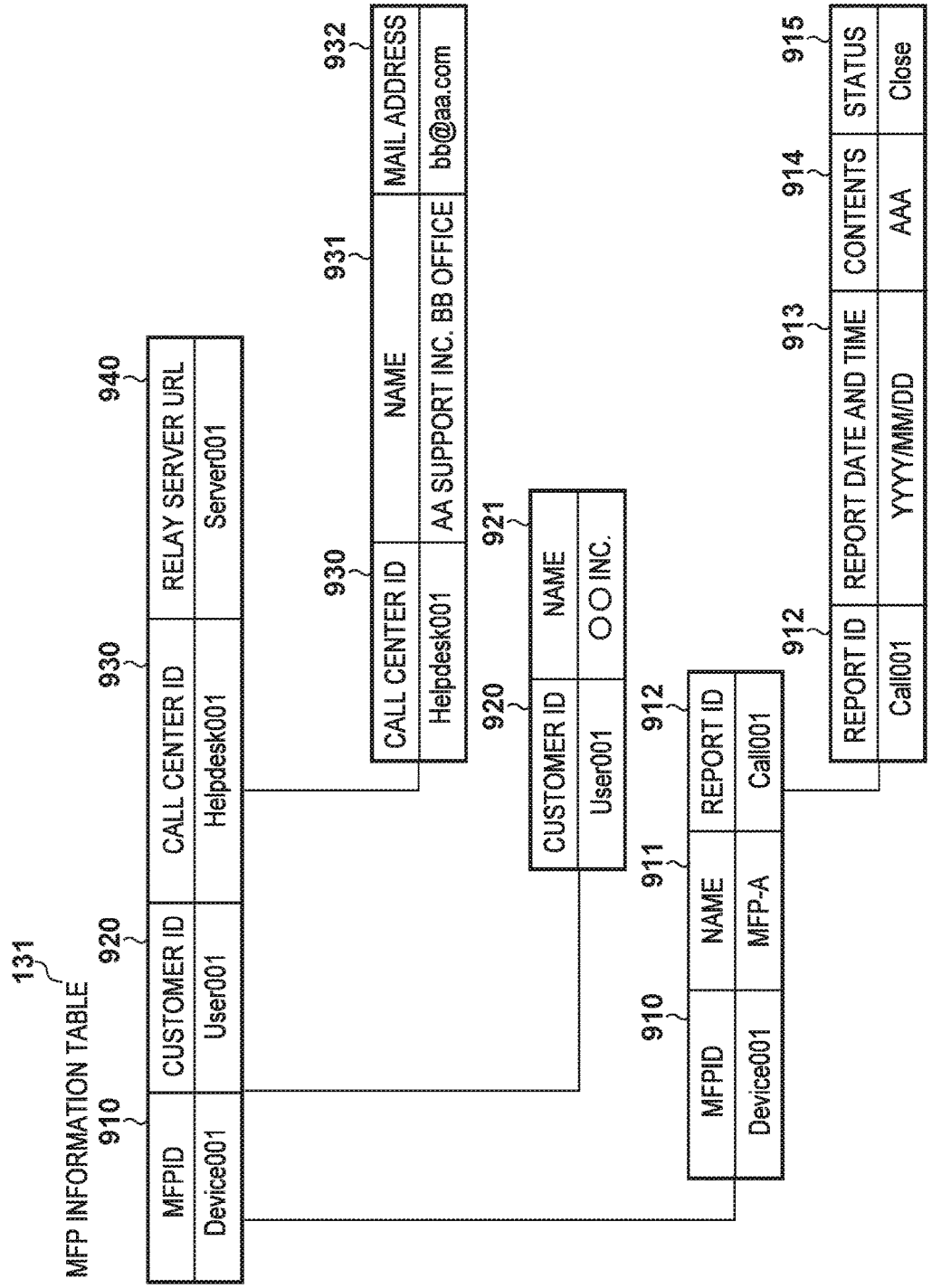
FIG. 9 depicts a view showing an example of the data structure of an MFP information table stored in the HDD of the management server according to the first embodiment.

FIG. 9 depicts a view showing an example of the data structure of the MFP information table 131 stored in the HDD 314 of the management server 130 according to the first embodiment. The information of one MFP is shown here. In fact, the table stores the information of a plurality of MFPs.

An MFP ID 910 is identification information used to identify an MFP. The MFP ID 910 corresponds to the above-described MFP identifier. The management server 130 compares the identifier of the MFP 100 that has transmitted an authentication request with the MFP ID 910. If it is confirmed that the MFP 100 that has transmitted the authentication request is an MFP managed by the management server 130, the management server 130 can issue an authentication token. A name 911 is the product name of the MFP. A report ID 912 is information used to identify the past report of the MFP 100. A plurality of report IDs 912 may exist in accordance with the number of reports. A report date and time 913 is the date and time of the report. A content 914 is information representing the contents of the report. A status 915 is information representing the status of the report.

A customer ID 920 is identification information used to identify the customer of the MFP 100. A name 921 is the name of the customer.

A call center ID 930 is identification information used to identify the call center (belonging destination) of the sales organization that manages the MFP 100. A name 931 is the name of the call center. A mail address 932 is the mail address of the call center.

A relay server URL 940 is the URL of the relay server 120 that is transmitted from the management server 130 to the MFP 100 in, for example, step S403 of FIG. 4. The relay server URL 940 can be set at once or individually for a plurality of MFPs recorded in the MFP information table 131 according to the call center ID 930. In general, the call center is run for each sales organization of MFPs. Hence, the relay server 120 is also prepared for each sales organization to reduce load or ensure security of the relay server 120. For this reason, the relay server URL 940 can be set more efficiently by setting it at once based on the call center ID 930 rather than by individually setting the relay server URL.

Figure 10:
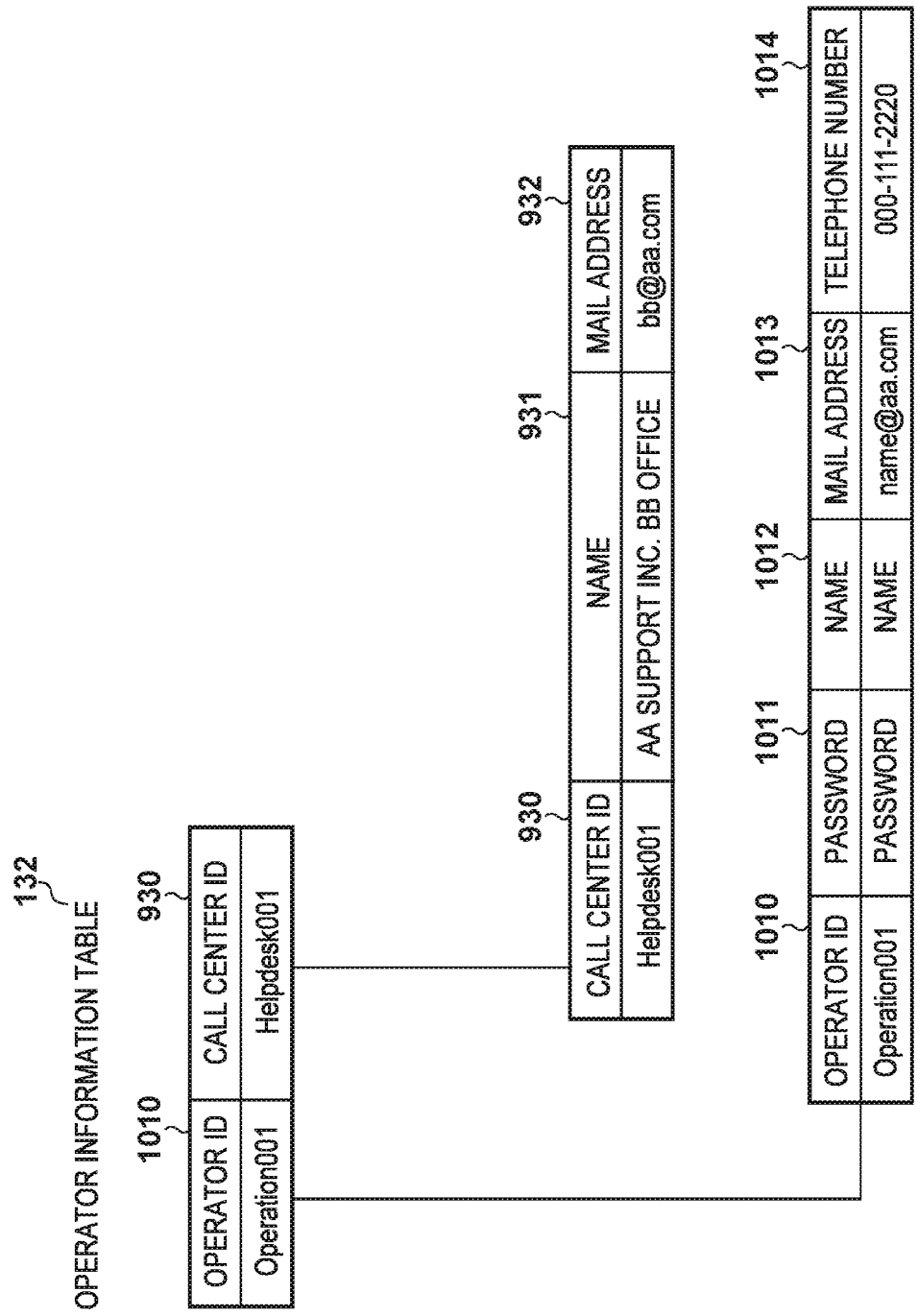
FIG. 10 depicts a view showing an example of the data structure of an operator information table stored in the HDD of the management server according to the first embodiment.

FIG. 10 depicts a view showing an example of the data structure of the operator information table 132 stored in the HDD 314 of the management server 130 according to the first embodiment. The information of one operator is shown here. In fact, the table stores the information of a plurality of persons.

An operator ID 1010 is identification information used to identify an operator corresponding to the user name transmitted from the PC 110 to the management server 130 in step S413 of FIG. 4 described above. A password 1011 is information corresponding to the password transmitted from the PC 110 to the management server 130 in step S413 described above or information that can uniquely be obtained from the password, for example, a hash value based on the password. A name 1012 is the name of the operator. A mail address 1013 is the mail address of the operator. A telephone number 1014 is the telephone number of the operator.

The call center ID 930 is identification information used to identify the above-described call center (the belonging destination of the PC), and represents to which call center the operator indicated by the operator ID 1010 belongs. The name 931 is information representing the name of the call center. The mail address 932 is the mail address of the call center.

As described above, according to the first embodiment, in response to a support start request from the MFP, the management server transmits the URL of the relay server of the connection destination to the MFP together with an authentication token. Accordingly, the MFP can be connected to the appropriate relay server, and the MFP and the PC that provides support can communicate via the relay server. When the management server returns an authentication token in response to an authentication request from the PC, the PC causes the relay server to verity the authentication token. If the authentication succeeds, the PC obtains a support URL from the relay server. Accordingly, the MFP and the PC can communicate with each other via the appropriate relay server, and the operator of the PC can support the user of the MFP. The MFP can thus receive the remote maintenance service from the PC even in an environment in which the MFP and the PC are protected from communication with the Internet by firewalls.

[Second Embodiment]

The second embodiment of the present invention will be described next. In the above-described first embodiment, as the method of allowing the PC 110 to specify the support URL of the MFP 100, a method has been described in which the relay server 120 first transmits a serial number corresponding to a created support URL to the MFP, and the MFP displays the serial number on the console unit 220. Then, the user of the MFP gives the serial number to the operator of the PC 110, and the serial number is transmitted from the PC 110 to the relay server 120. The relay server 120 thus specifies the support URL and notifies the PC 110 of it. In the second embodiment, however, an example in which a support URL is specified using not a serial number but the identifier of an MFP will be described. Note that a system arrangement and the hardware arrangements of an MFP, a PC, a relay server, and a management server according to the second embodiment are the same as those of the above-described first embodiment, and a description thereof will be omitted.

In a call center, an operator sometimes orally asks about the user information of a customer or information about a target MFP 100 before the start of the remote maintenance service. In this case, the operator in the call center starts the remote maintenance service in a state in which he/she knows the identifier of the MFP 100 to be connected. The operator may directly ask about the identifier of the MFP or specify it using an MFP information table 131 of a management server 130 based on obtained information. A method of causing a relay server 120 to obtain a support URL using the MFP identifier will be described.

Figure 11:
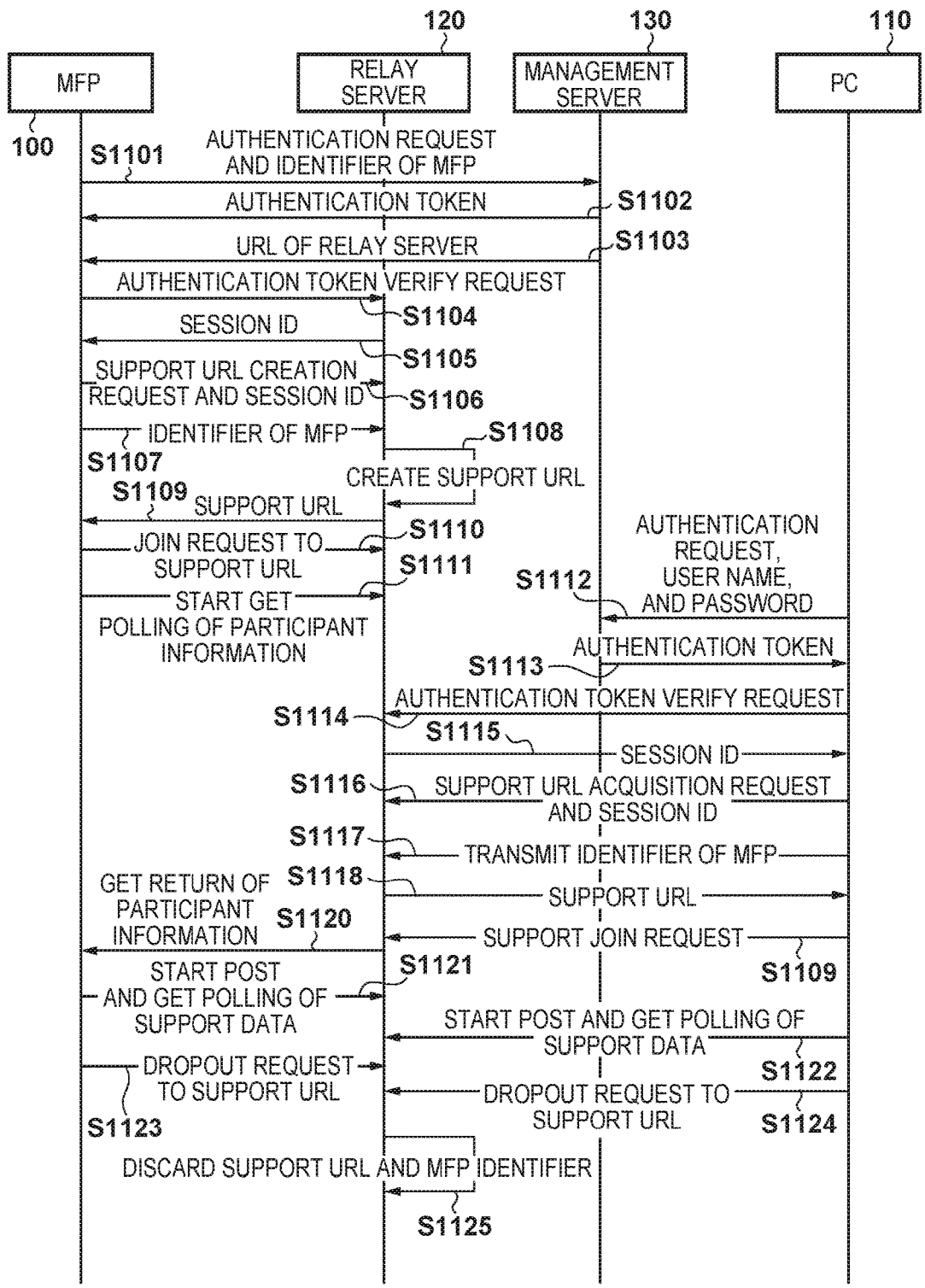
FIG. 11 is a sequence chart for explaining communication between an MFP, a PC, a relay server, and a management server according to the second embodiment.

FIG. 11 is a sequence chart for explaining communication between the MFP 100, a PC 110, the relay server 120, and the management server 130 according to the second embodiment. The operation shown in this sequence chart is implemented when a CPU 211 of the MFP 100 executes a program deployed from an HDD 214 into a RAM 213. The processing of each of the PC 110, the relay server 120 and the management server 130 is implemented when a CPU 311 of the apparatus executes a program deployed from an HDD 314 into a RAM 313. Note that FIG. 11 is almost the same as FIG. 4 of the above-described embodiment, and only different portions will be described.

Steps S1101 to S1106 are the same as steps S401 to S406 of FIG. 4 according to the first embodiment, and a description thereof will be omitted. Here, the MFP 100 obtains the URL of the relay server 120 from the management server 130. In addition, the MFP 100 transmits a support URL creation request and a session ID to the relay server 120.

In step S1107, the MFP 100 transmits the identifier of the MFP to the relay server 120. In step S1108, the relay server 120 creates a support URL. In step S407 of the above-described first embodiment, a serial number is simultaneously generated, and the pair of the support URL and the serial number is saved in the RAM 213. In the second embodiment, however, the serial number is not created, and the support URL and the identifier of the MFP are saved in the RAM 213 in association with each other. In steps S1109, S1110, and S1111, the MFP 100 requests join to the support URL and starts communicating with the relay server 120, as in steps S408, S409, and S412 of FIG. 4.

In steps S1112 to S1116, the PC 110 obtains an authentication token from the management server 130, transmits a support URL creation request and a session ID to the relay server 120 based on the authentication token, as in steps S413 to S417 of FIG. 4.

In step S1117, the PC 110 transmits the identifier of the MFP to the relay server 120. Accordingly, the relay server 120 compares the identifier of the MFP received in step S1117 with the identifier of the MFP saved in the RAM 213, obtains a support URL corresponding to it, and transmits the support URL to the PC 110 in step S1118. The PC 110 can thus start the remote maintenance service via the relay server 120.

Steps S1119 to S1124 are the same as steps S420 to S425 of FIG. 4 according to the first embodiment, and a description thereof will be omitted. Finally, upon receiving a dropout request from each of the MFP 100 and the PC 110 to the support URL, the relay server 120 discards the support URL and the MFP identifier saved in the RAM 213 in step S1125, and ends the processing.

This allows the operator of the PC 110 in the call center to start the remote maintenance service in a state in which he/she knows the identifier of the MFP 100 as the target of the remote maintenance service.

Figure 12A:
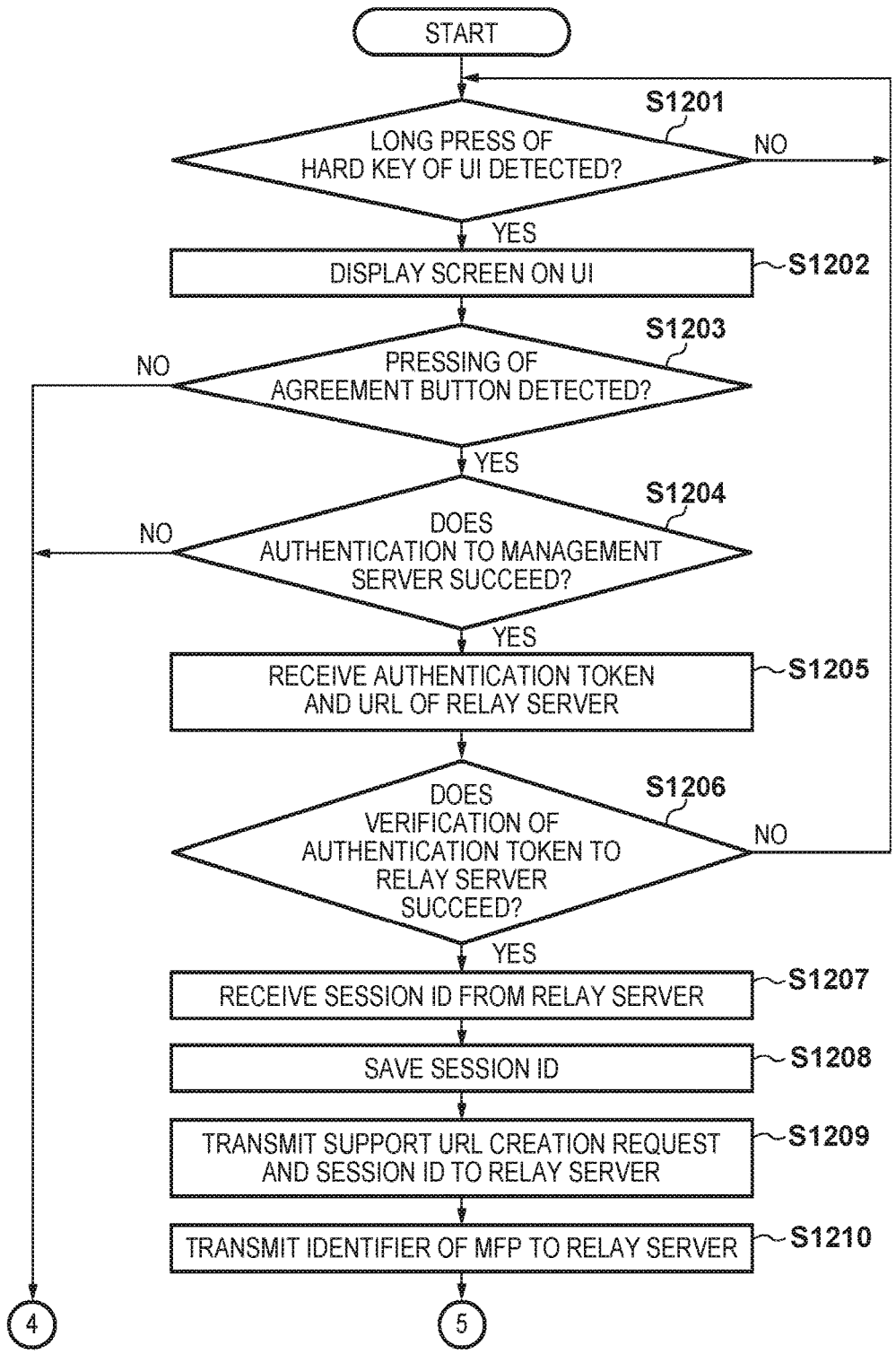
FIGS. 12A and 12B are flowcharts for describing processing executed by the MFP according to the second embodiment.
Figure 12B:
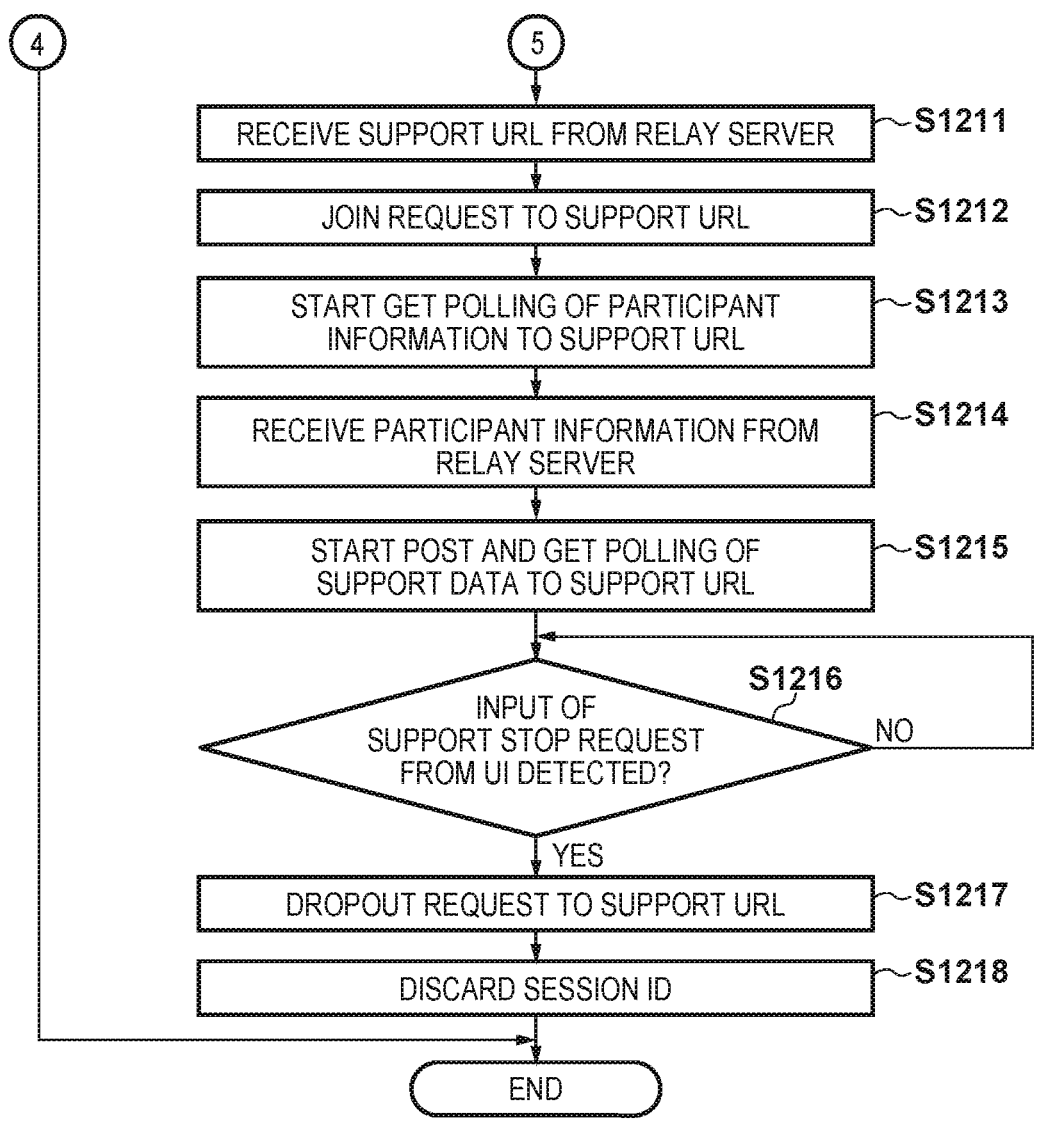

FIGS. 12A and 12B are flowcharts for describing processing executed by the MFP 100 according to the second embodiment. Note that each operation (step) shown in this flowchart is implemented when the CPU 211 of the MFP 100 deploys a program stored in the HDD 214 into the RAM 213 and executes it. Note that the flowcharts of FIGS. 12A and 12B are almost the same as FIGS. 5A and 5B of the above-described first embodiment, and only different portions will be described below.

Steps S1201 to S1209 are the same as steps S501 to S509 of FIG. 5A, and a description thereof will be omitted.

In step S1210, the CPU 211 transmits the identifier of the MFP to the relay server 120. Steps S1211 and S1212 are the same as steps S510 and S511 of FIGS. 5A and 5B, and a description thereof will be omitted. Steps S1213 to S1218 are the same as steps S514 to S519 of FIG. 5B, and a description thereof will be omitted.

Here, the CPU 211 transmits the identifier of the MFP 100 to the relay server 120 before reception of the support URL in step S1211. The relay server 120 thus saves the identifier of the MFP 100 and the support URL in association with each other. In the second embodiment, since the serial number used in the first embodiment is not used, processing of receiving and displaying the serial number as in steps S512 and S513 of FIG. 5B can be omitted.

Figure 13:
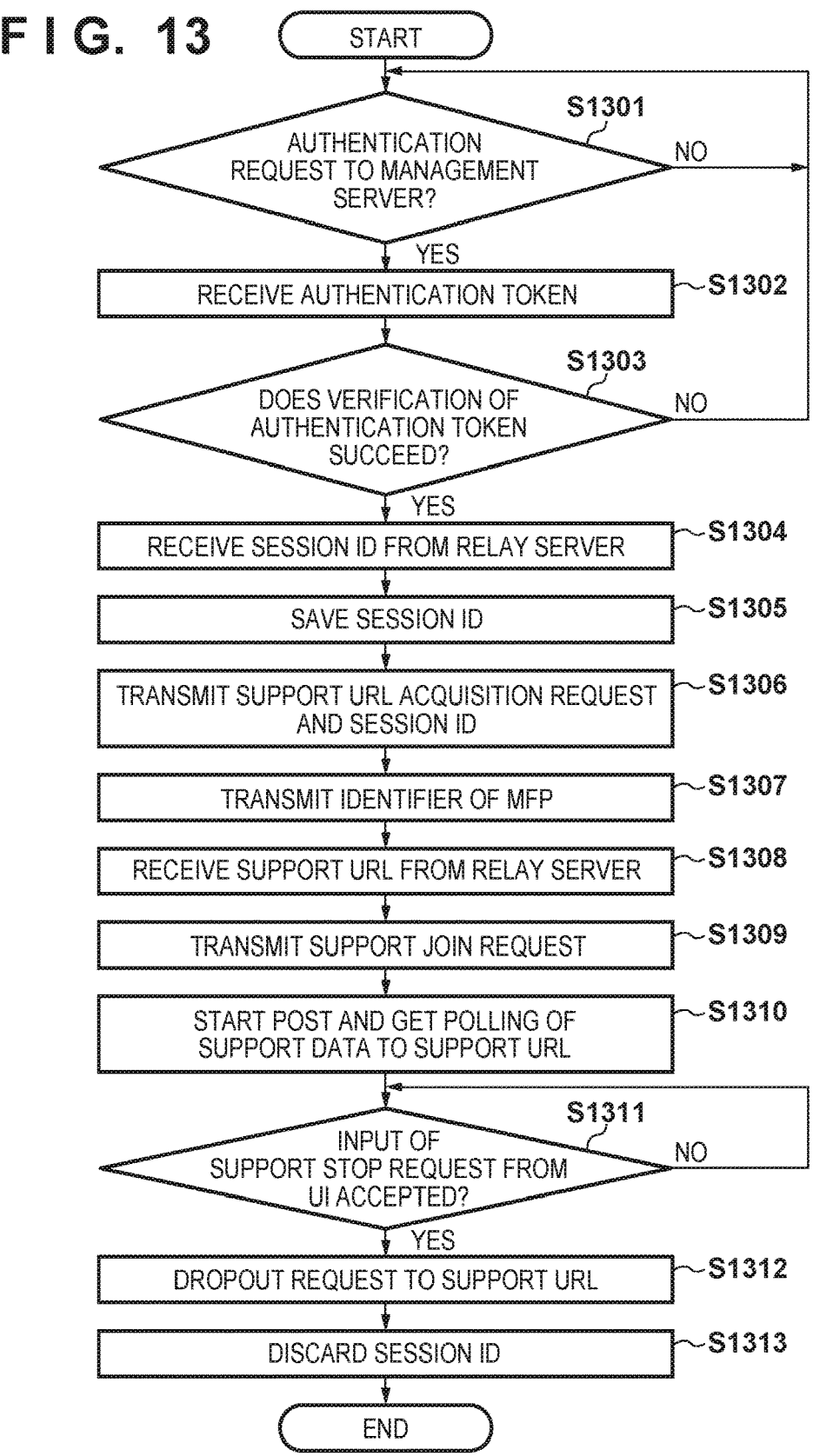
FIG. 13 is a flowchart for describing processing executed by the PC according to the second embodiment.

FIG. 13 is a flowchart for describing processing executed by the PC 110 according to the second embodiment. Note that each operation (step) shown in this flowchart is implemented when the CPU 311 of the PC 110 deploys a program stored in the HDD 314 into the RAM 313 and executes it. Note that this flowchart is almost the same as FIG. 6 of the above-described first embodiment, and only different portions will be described below. Steps S1301 to S1306 are the same as steps S601 to S606 of FIG. 6, and a description thereof will be omitted.

In step S1307, the CPU 311 transmits the identifier of the MFP to the relay server 120. Note that the identifier of the MFP 100 transmitted in step S1307 is the identifier already obtained from the customer information before the start of the remote maintenance service, as described above. Steps S1308 and S1313 are the same as steps S608 and S613 of FIG. 6, and a description thereof will be omitted.

Figure 14A:
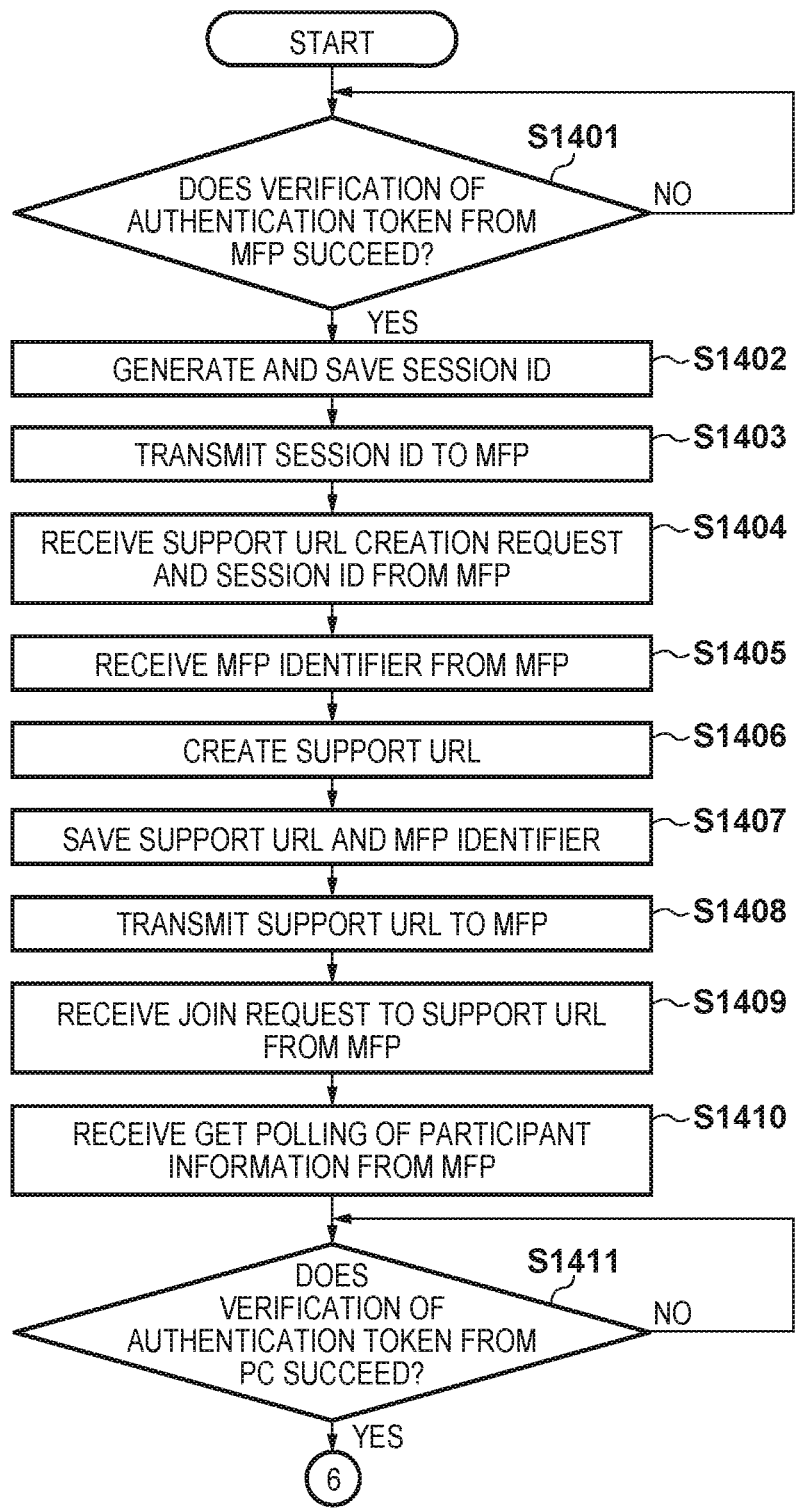
FIGS. 14A and 14B are flowcharts for describing processing executed by the relay server according to the second embodiment.
Figure 14B:
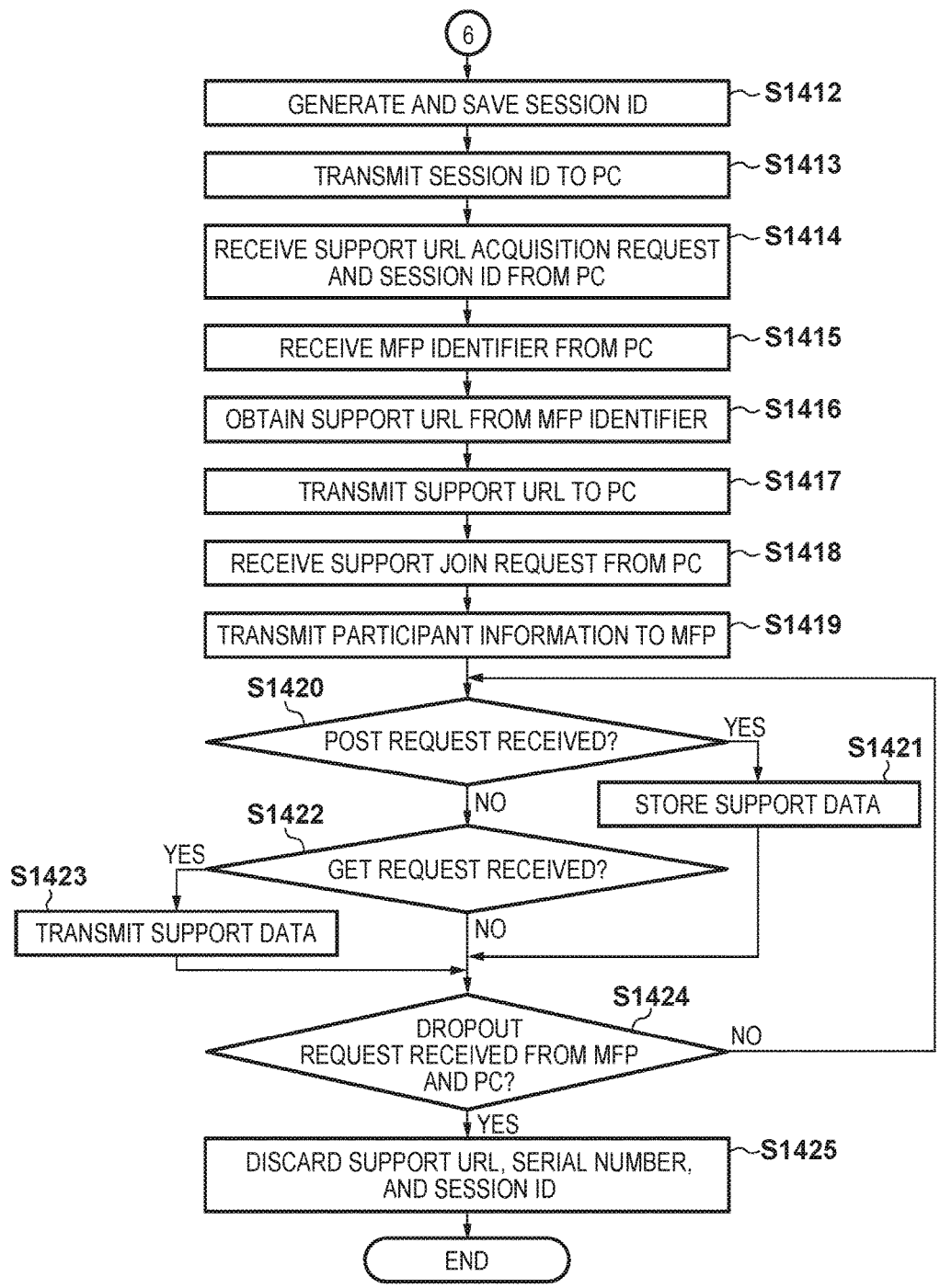

FIGS. 14A and 14B are flowcharts for describing processing executed by the relay server 120 according to the second embodiment. Note that each operation (step) shown in this flowchart is implemented when the CPU 311 of the relay server 120 deploys a program stored in the HDD 314 into the RAM 313 and executes it. Note that this flowchart is almost the same as FIGS. 7A and 7B of the above-described first embodiment, and only different portions will be described below. Steps S1401 to S1404 are the same as steps S701 to S704 of FIG. 7A, and a description thereof will be omitted.

In step S1405, the CPU 311 receives the MFP identifier from the MFP 100. The process advances to step S1406, and the CPU 311 confirms the session ID received in step S1404 and creates a support URL. The process advances to step S1407, and the CPU 311 saves the pair of the support URL and the MFP identifier in the RAM 313. The support URL can be obtained from the MFP identifier by referring to the MFP identifier saved in the RAM 313. Steps S1408 and S1409 are the same as steps S708 and S709 of FIG. 7A, and a description thereof will be omitted. Steps S1410 to S1414 are the same as steps S711 to S715 of FIGS. 7A and 7B, and a description thereof will be omitted.

In step S1415, the CPU 311 receives the MFP identifier from the PC 110. The process advances to step S1416, and using the received MFP identifier, the CPU 311 obtains the support URL from the pair of the MFP identifier and the support URL saved in the RAM 313. Steps S1417 to S1424 are the same as steps S718 to S725 of FIG. 7B, and a description thereof will be omitted. Finally, if support by the operator of the PC 110 ends, in step S1425, the CPU 311 discards the support URL, the MFP identifier, and the session ID saved in the RAM 313, and ends the processing.

Note that processing executed by the management server 130 according to the second embodiment is the same as that in the flowchart of FIG. 8 according to the above-described first embodiment, and a description thereof will be omitted.

As described above, according to the second embodiment, the management server transmits the URL of the relay server of the connection destination to the MFP together with an authentication token. Accordingly, the MFP can be connected to the appropriate relay server, the MFP and the PC can communicate via the relay server, and the MFP can receive the remote maintenance service from the PC.

[Third Embodiment]

The third embodiment of the present invention will be described next. In the above-described first embodiment, an example in which to allow the PC to specify the support URL of the MFP, a serial number corresponding to a support URL created by the relay server is created, and the relay server specifies the PC and the MFP based on the serial number has been described. In the second embodiment, an example in which a support URL is given to the PC using not a serial number but the identifier of the MFP has been described. In the third embodiment, an example in which the MFP transmits a support URL and the identifier of the MFP to the management server, and the management server transmits the support URL to the PC will be described. Note that a system arrangement and the hardware arrangements of an MFP, a PC, a relay server, and a management server according to the third embodiment are the same as those of the above-described first embodiment, and a description thereof will be omitted.

Figure 15:
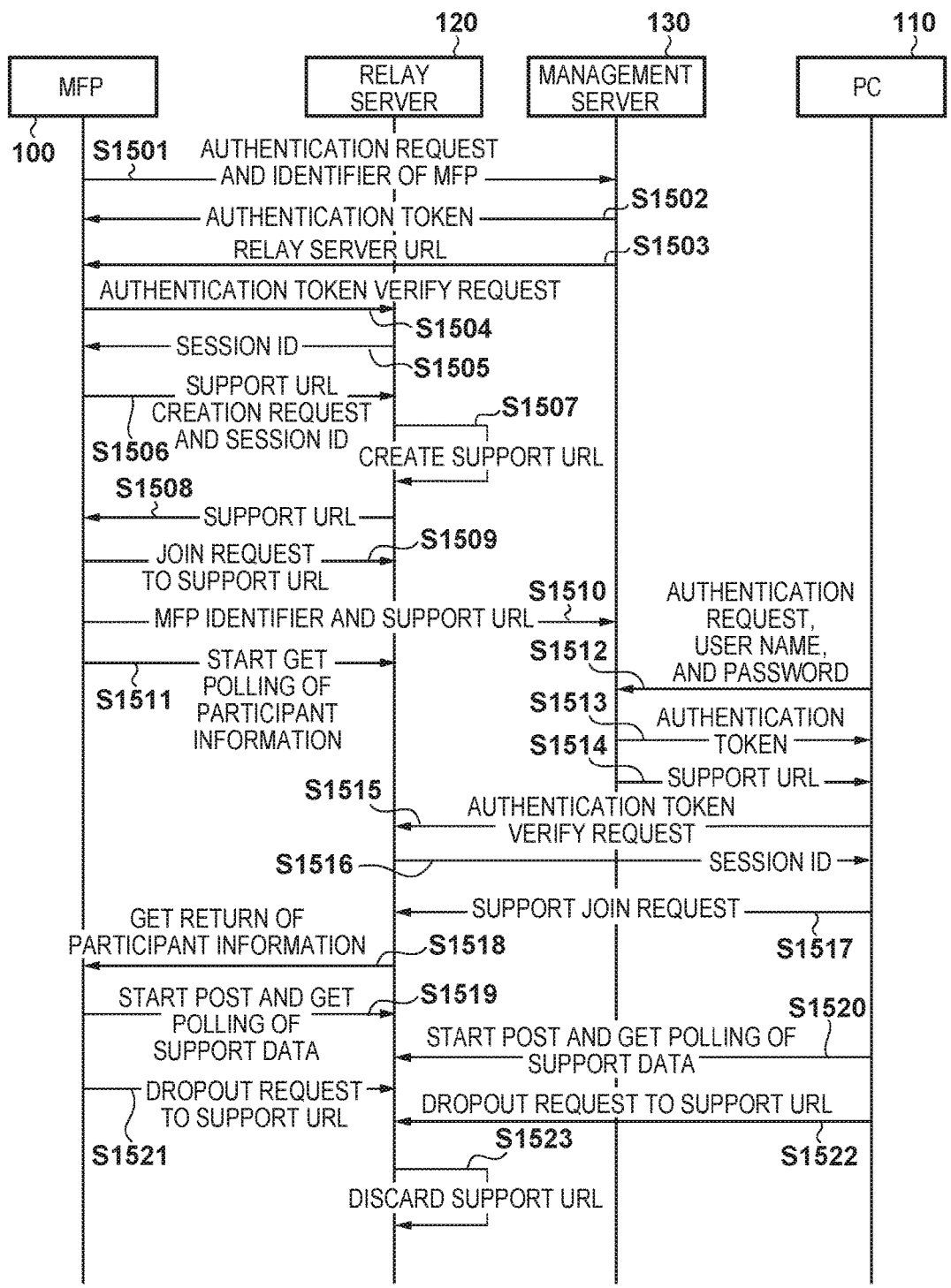
FIG. 15 is a sequence chart for explaining communication between an MFP, a PC, a relay server, and a management server according to the third embodiment.

FIG. 15 is a sequence chart for explaining communication between an MFP 100, a PC 110, a relay server 120, and a management server 130 according to the third embodiment. The operation shown in this sequence chart is implemented when a CPU 211 of the MFP 100 executes a program deployed from an HDD 214 into a RAM 213. The processing of each of the PC 110, the relay server 120 and the management server 130 is implemented when a CPU 311 executes a program deployed from an HDD 314 into a RAM 313. Note that FIG. 15 is almost the same as FIG. 4 of the above-described embodiment, and only different portions will be described.

Steps S1501 to S1506 are the same as steps S401 to S406 of FIG. 4, and a description thereof will be omitted. In step S1507, the relay server 120 creates a support URL. Steps S1508 and S1509 are the same as steps S408 and S409 of FIG. 4, and a description thereof will be omitted.

In step S1510, the MFP 100 transmits the identifier of the MFP and the support URL to the management server 130. Steps S1511 to S1513 are the same as steps S412 to S414 of FIG. 4, and a description thereof will be omitted. In step S1514, the management server 130 transmits the support URL to the PC 110. As for the transmission means, the management server 130 transmits the support URL by sending email to a call center mail address 932 that can be obtained from an MFP information table 131 using the MFP identifier. Steps S1515 and S1516 are the same as steps S415 and S416 of FIG. 4, and a description thereof will be omitted. Steps S1517 to S1522 are the same as steps S420 to S425 of FIG. 4, and a description thereof will be omitted. Finally, if support by the operator of the PC 110 ends, in step S1523, the relay server 120 discards the support URL, and ends the processing.

Figure 16A:
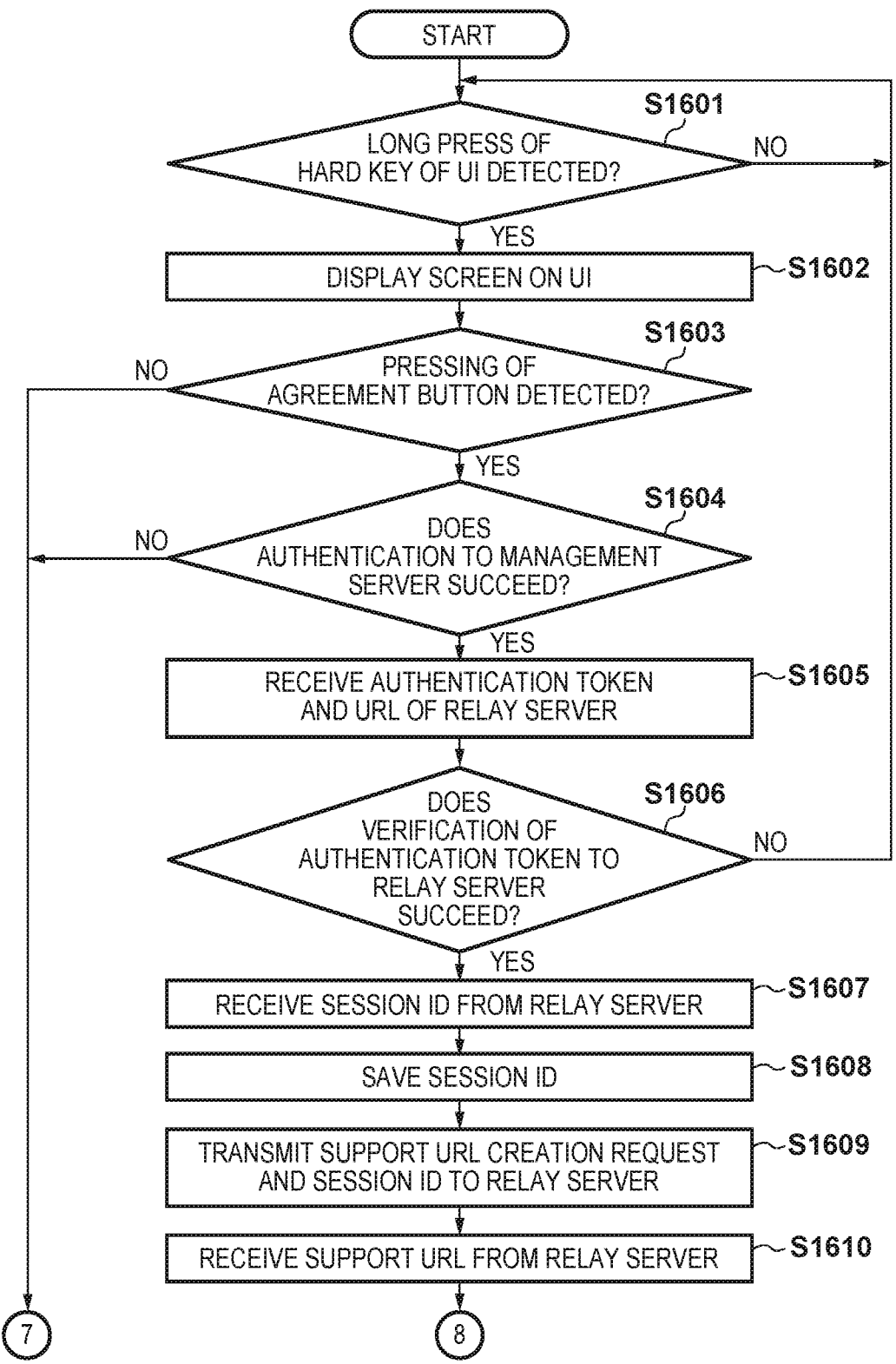
FIGS. 16A and 16B are flowcharts for describing processing executed by the MFP according to the third embodiment.
Figure 16B:
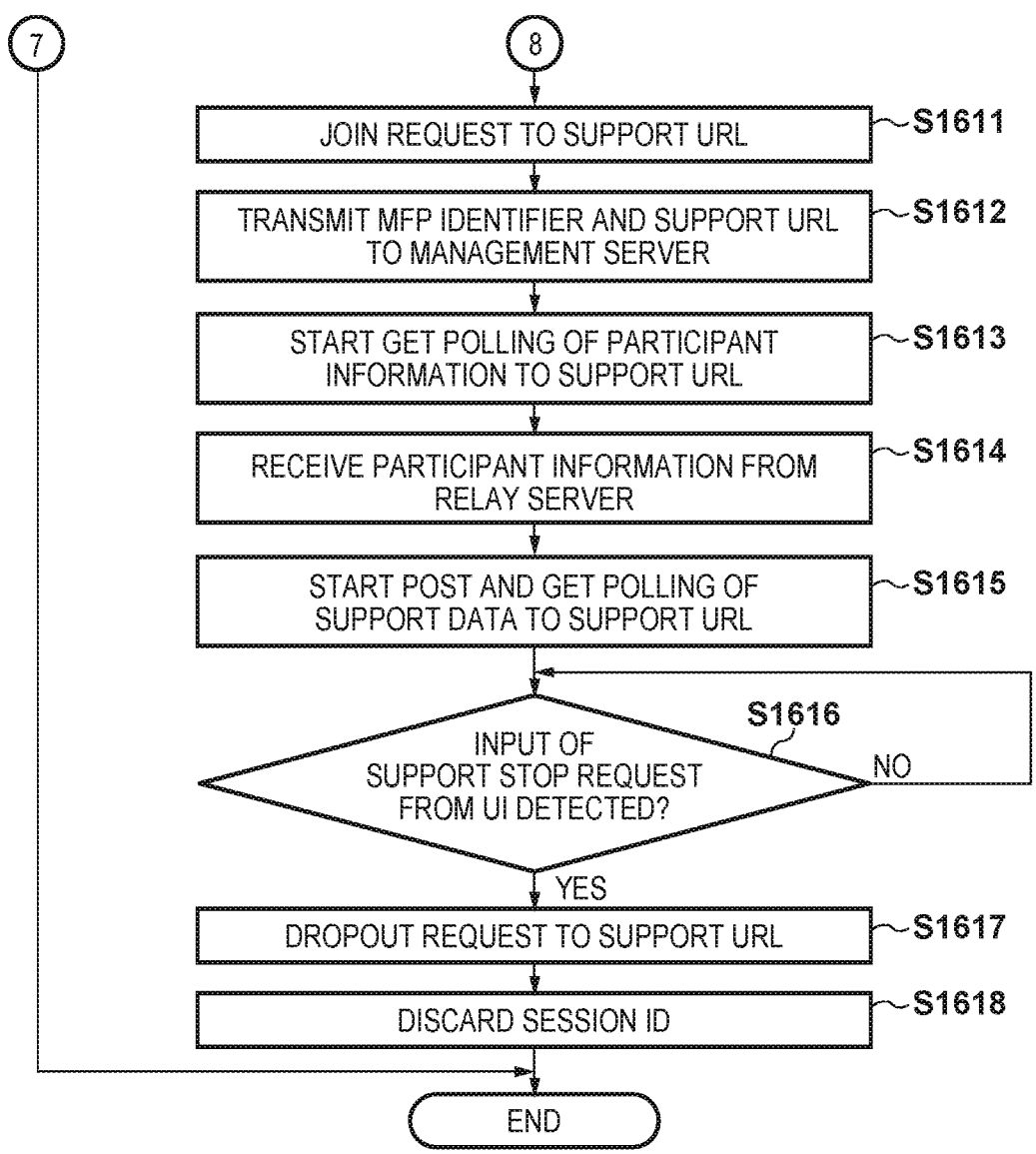

FIGS. 16A and 16B are flowcharts for describing processing executed by the MFP 100 according to the third embodiment. Note that each operation (step) shown in this flowchart is implemented when the CPU 211 of the MFP 100 deploys a program stored in the HDD 214 into the RAM 213 and executes it. Note that the flowcharts of FIGS. 16A and 16B are almost the same as the flowcharts of FIGS. 5A and 5B according to the above-described first embodiment, and only different portions will be described below. Steps S1601 to S1611 are the same as steps S501 to S511 of FIGS. 5A and 5B, and a description thereof will be omitted.

In step S1612, the CPU 211 transmits the identifier of the MFP 100 and the support URL received in step S1610 to the management server 130. Steps S1613 to S1618 are the same as steps S514 to S519 of FIG. 5B, and a description thereof will be omitted.

Figure 17:
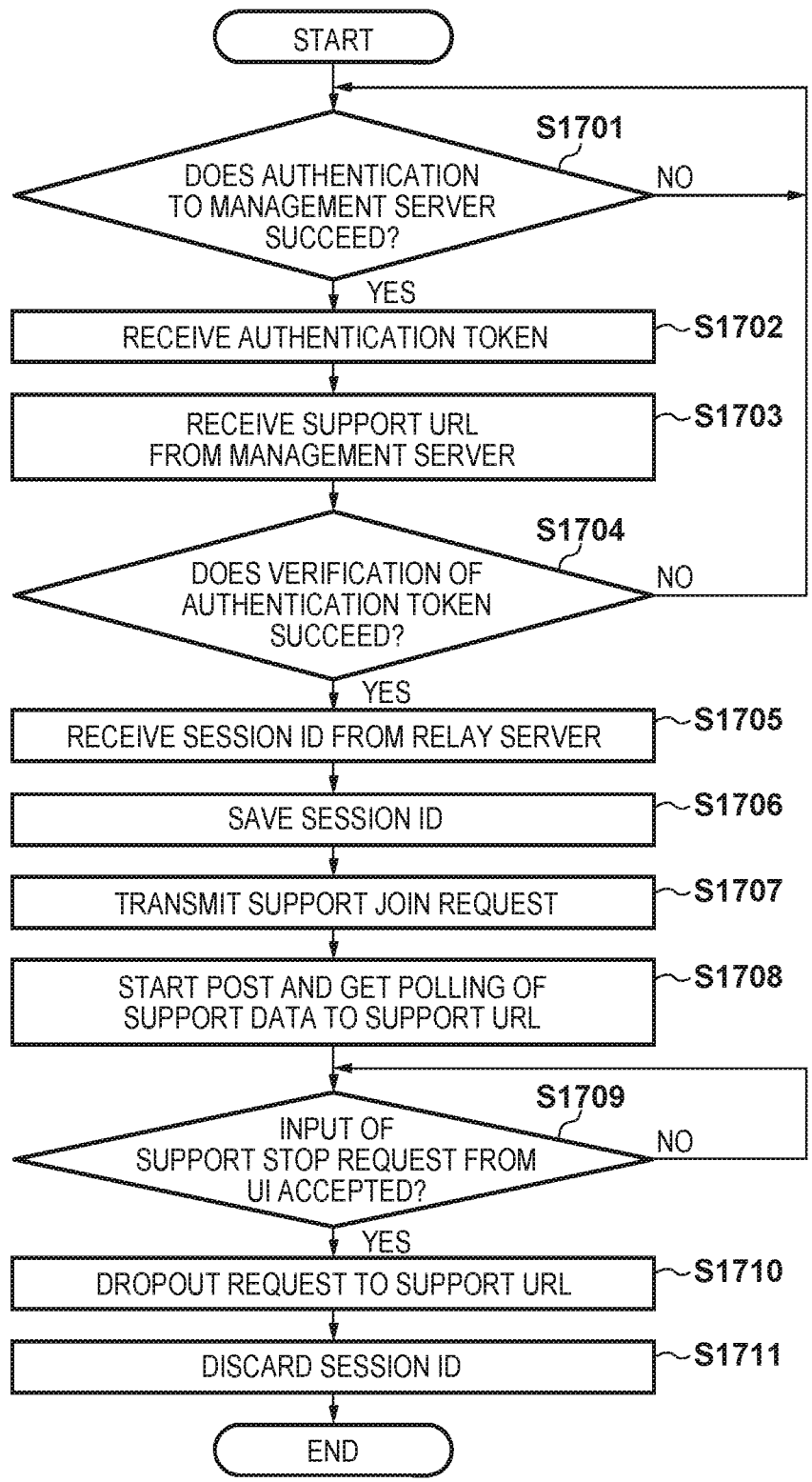
FIG. 17 is a flowchart for describing processing executed by the PC according to the third embodiment.

FIG. 17 is a flowchart for describing processing executed by the PC 110 according to the third embodiment. Note that each operation (step) shown in this flowchart is implemented when the CPU 311 of the PC 110 deploys a program stored in the HDD 314 into the RAM 313 and executes it. Note that this flowchart is almost the same as the flowchart of FIG. 6 according to the above-described first embodiment, and only different portions will be described below. Steps S1701 and S1702 are the same as steps S601 and S602 of FIG. 6, and a description thereof will be omitted.

In step S1703, the CPU 311 receives the support URL from the management server 130. As the support URL reception method here, email transmitted from the management server 130 is used. Steps S1704 to S1706 are the same as steps S603 to S605 of FIG. 6, and a description thereof will be omitted. In step S1707, the CPU 311 transmits a support join request to the relay server 120 using the support URL received in step S1703. Steps S1708 to S1711 are the same as steps S610 to S613 of FIG. 6, and a description thereof will be omitted.

Figure 18A:
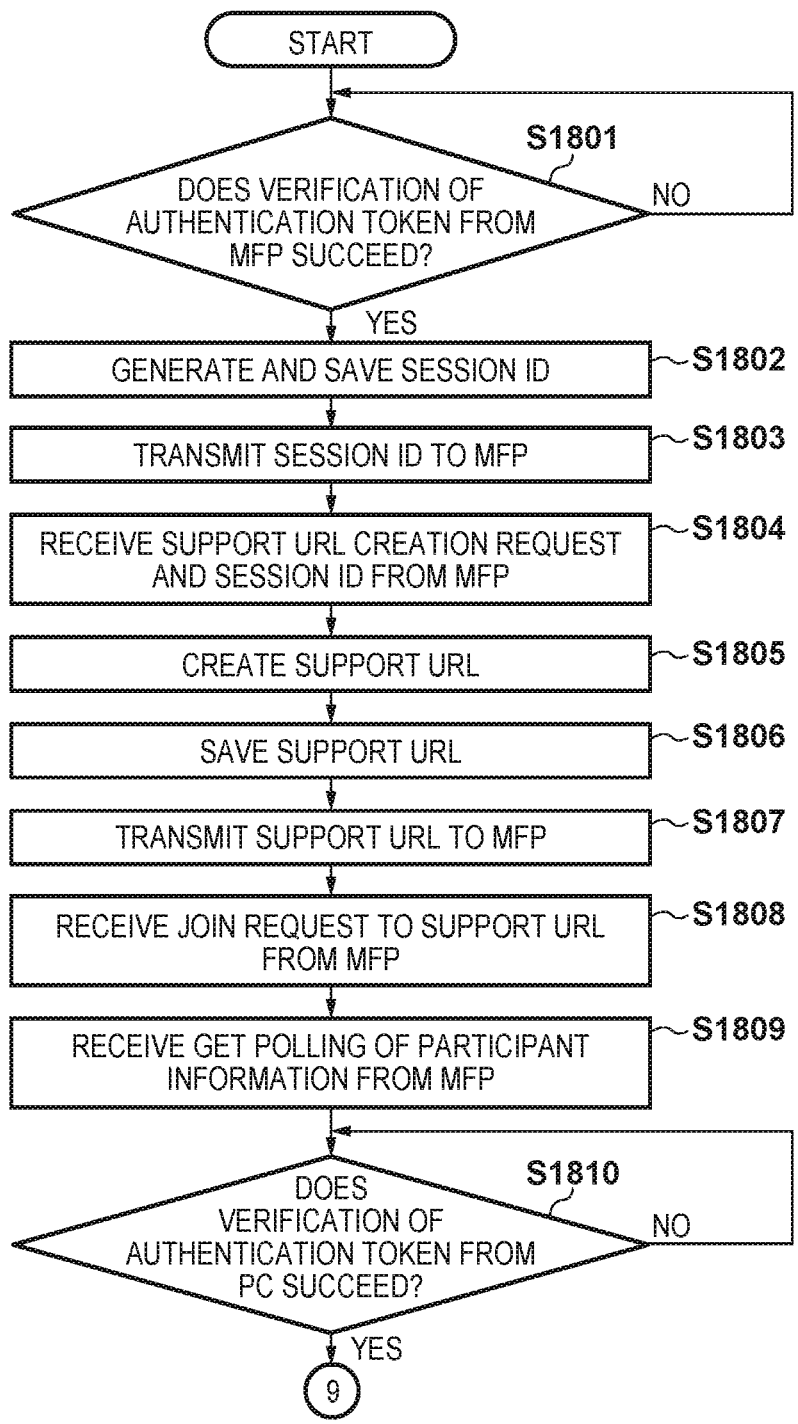
FIGS. 18A and 18B are flowcharts for describing processing executed by the relay server according to the third embodiment.
Figure 18B:
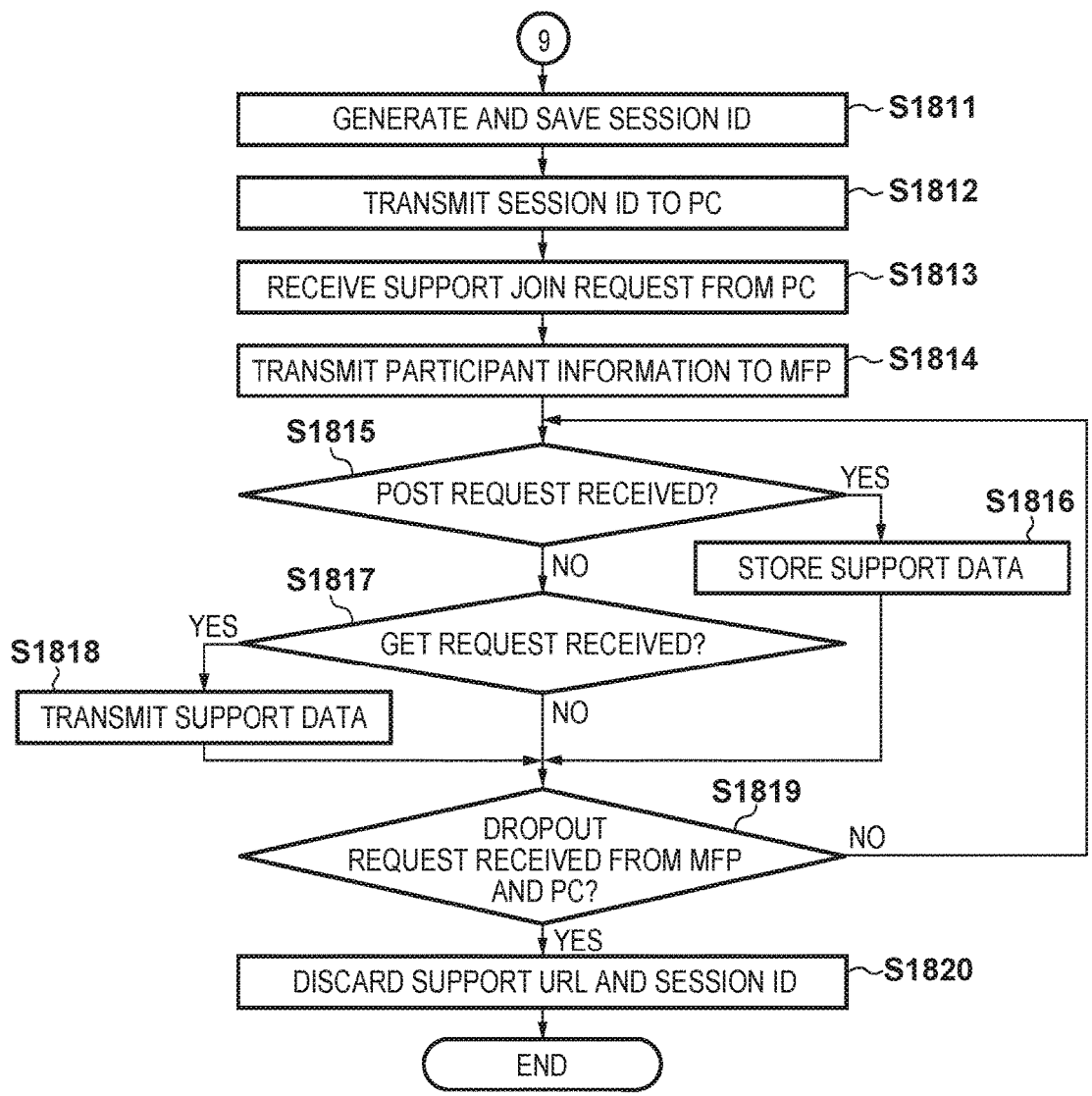

FIGS. 18A and 18B are flowcharts for describing processing executed by the relay server 120 according to the third embodiment. Note that each operation (step) shown in this flowchart is implemented when the CPU 311 of the relay server 120 deploys a program stored in the HDD 314 into the RAM 313 and executes it. Note that this flowchart is almost the same as the flowcharts of FIGS. 7A and 7B according to the above-described first embodiment, and only different portions will be described below. Steps S1801 to S1805 of FIG. 18A are the same as steps S701 to S705 of FIG. 7A, and a description thereof will be omitted.

In step S1806, the CPU 311 saves the support URL created in step S1805 in the RAM 313. Steps S1807 and S1808 are the same as steps S708 and S709 of FIG. 7A, and a description thereof will be omitted. Steps S1809 to S1812 are the same as steps S711 to S714 of FIGS. 7A and 7B, and a description thereof will be omitted. Steps S1813 to S1820 are the same as steps S719 to S726 of FIG. 7B, and a description thereof will be omitted.

FIG. 19 is a flowchart for describing processing executed by the management server 130 according to the third embodiment. Note that each operation (step) shown in this flowchart is implemented when the CPU 311 of the management server 130 deploys a program stored in the HDD 314 into the RAM 313 and executes it. Note that this flowchart is almost the same as the flowchart of FIG. 8 according to the above-described first embodiment, and only different portions will be described below. Steps S1901 to S1904 of FIG. 19 are the same as steps S801 to S804 of FIG. 8, and a description thereof will be omitted.

In step S1905, the CPU 311 receives the identifier and the support URL from the MFP 100. Steps S1906 to S1908 are the same as steps S805 to S807 of FIG. 8, and a description thereof will be omitted. The process advances to step S1909, and the CPU 311 obtains the call center mail address 932 from the MFP information table 131 using the MFP identifier received in step S1905. The process advances to step S1910, and the CPU 311 transmits the support URL received in step S1905 to the call center mail address 932 obtained in step S1909.

As described above, according to the third embodiment, the management server 130 transmits the URL of the relay server 120 of the connection destination to the MFP 100 and the PC 110 together with an authentication token. Accordingly, the MFP 100 can be connected to the appropriate relay server 120, communicate with the PC 110 via the relay server 120, and receive the remote maintenance service from the PC 110.

Other Embodiment

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-180115, filed Sep. 11, 2015, which is hereby incorporated by reference herein in its entirety.

What is claimed is:

1. A communication system including a first terminal and a second terminal, at least one management server, and a relay server configured to relay communication between the first terminal and the second terminal,
   wherein the at least one management server comprises:
   at least one first memory device that stores a set of instructions; and
   at least one processor that executes the instructions stored in the at least one first memory device to:
   notify, in a case where the first terminal is authenticated in response to a request from the first terminal, the first terminal of first authority information used by the first terminal to request the relay server to verify an authority of the first terminal and connection information used by the first terminal to connect to the relay server; and
   notify, in a case where the second terminal is authenticated in response to a request from the second terminal, the second terminal of second authority information used by the second terminal to request the relay server to verify an authority of the first terminal, and
   wherein the relay server comprises:
   at least one second memory device that stores a set of instructions; and
   at least one processor that executes the instructions stored in the at least one second memory device to:
   verify the first authority information which is transmitted by the first terminal to the relay server using the connection information;
   verify the second authority information which is transmitted by the second terminal to the relay server using the connection information;
   issue, in a case where a verification of the first authority information received from the first terminal succeeds, access information used for the communication between the first terminal and the second terminal via the relay server and transmit the access information to the first terminal;
   transmit the access information to the second terminal in a case where a verification of the second authority information received from the second terminal succeeds; and
   relay support data including at least instruction data for remote control of the first terminal by the second terminal based on the access information,
   wherein the relay server receives, from the second terminal, after the verification of the second authority information succeeds, specifying information corresponding to the first terminal, and, the relay server transmits, to the second terminal, the access information corresponding to the specifying information received from the second terminal.

2. The system according to claim 1, wherein the at least one processor of the at least one management server executes instructions in the at least one first memory device to:
   issue, in a case where the verification of the first authority information received from the first terminal succeeds, create acceptance information representing that a connection request is accepted and transmit the acceptance information to the first terminal together with the access information; and transmit the access information to the second terminal in a case where the specifying information including the acceptance information and the authentication information from the second terminal is received.

3. The system according to claim 1, wherein the at least one processor of the at least one management server executes instructions in the at least one first memory device to:

transmit, to the second terminal, a session identification information, in a case where the verification of the second authority information received from the second terminal succeeds, transmit the access information to the second terminal, in a case where the session identification information and the specifying information are received from the second terminal.

4. The system according to claim 2, wherein the first terminal further comprises a display unit configured to display the acceptance information received from the relay server, and wherein the second terminal further comprises an input unit configured to cause a user of the second terminal to input the acceptance information.

5. The system according to claim 1, wherein the first terminal and the second terminal communicate via the relay server by a POST method and a GET method.

6. The system according to claim 1, wherein the first terminal further comprises a memory device that stores a set of instructions; and
at least one processor that executes the instructions stored in the memory device of the first terminal to:
instruct to start the communication performed between the first terminal and the second terminal,
wherein the request is transmitted to the management server in accordance with an instruction by the at least one processor of the first terminal.

7. The system according to claim 1, wherein the at least one processor of the at least one management server executes instructions in the at least one first memory device to:

store, in a storage unit, identification information of the first terminal, the connection information to the relay server, that is used by the first terminal, and information of a belonging destination of the second terminal related to the first terminal; and store, in the storage unit, identification information of an operator of the belonging destination of the second terminal.

8. The system according to claim 1, wherein the at least one processor of the relay server executes instructions in the at least one second memory device to:

discard the connection information upon receiving an end of the communication from one of the first terminal and the second terminal.

9. A method of controlling a communication system including a first terminal and a second terminal, at least one management server, and a relay server configured to relay communication between the first terminal and the second terminal, wherein the at least one management server executes:
in a case where the first terminal is authenticated in response to a request from the first terminal, notifying the first terminal of first authority information used by the first terminal to request the relay server to verify an authority of the first terminal and connection information used by the first terminal to connect to the relay server; and in a case where the second terminal is authenticated in response to a request from the second terminal, notifying the second terminal of second authority information used by the second terminal to request the relay server to verify an authority of the first terminal, and wherein the relay server executes:
verifying the first authority information which is transmitted by the first terminal to the relay server using the connection information;

verifying the second authority information which is transmitted by the second terminal to the relay server using the connection information;

in a case where a verification of the first authority information received from the first terminal succeeds, issuing access information used for the communication between the first terminal and the second terminal via the relay server and transmitting the access information to the first terminal;

transmitting the access information to the second terminal in a case where a verification of the second authority information received from the second terminal succeeds; and relaying support data including at least instruction data for remote control of the first terminal by the second terminal based on the access information, wherein the relay server receives, from the second terminal, after the verification of the second authority information succeeds, specifying information corresponding to the first terminal, and, the relay server transmits, to the second terminal, the access information corresponding to the specifying information received from the second terminal.

* * * * *